United States Patent [19]
Maki

[11] Patent Number: 5,124,980
[45] Date of Patent: Jun. 23, 1992

[54] SYNCHRONOUS MULTIPORT DIGITAL 2-WAY COMMUNICATIONS NETWORK USING T1 PCM ON A CATV CABLE

[76] Inventor: Gerald G. Maki, 7304 NE. 162nd St., Bothell, Wash. 98011

[21] Appl. No.: 325,857

[22] Filed: Mar. 20, 1989

[51] Int. Cl.⁵ .................... H04J 3/00; H04L 27/08
[52] U.S. Cl. .................... 370/77; 370/113; 375/98
[58] Field of Search .......... 455/5, 3, 4, 6, 234, 455/235; 370/95.2, 95.3, 85.8, 85.1, 105.1, 103, 4, 100.1, 77, 79, 85.7, 95.1, 113; 340/825.08; 379/92, 90; 375/109, 98; 358/85, 86

[56] References Cited

U.S. PATENT DOCUMENTS

| | | | |
|---|---|---|---|
| 4,330,859 | 5/1982 | Takada | 370/97 |
| 4,343,042 | 8/1982 | Schrock et al. | 455/5 |
| 4,347,604 | 8/1982 | Saito et al. | 370/105.1 |
| 4,411,007 | 10/1983 | Rodman et al. | 375/109 |
| 4,470,141 | 9/1984 | Takada | 370/105.1 |
| 4,490,169 | 2/1985 | Rozmus | 370/95.3 |
| 4,562,573 | 12/1985 | Murano et al. | 370/85.1 |
| 4,592,050 | 5/1986 | Bensadon | 370/103 |
| 4,633,462 | 12/1986 | Stifle et al. | 455/5 |
| 4,694,453 | 9/1987 | Kobayashi et al. | 370/85.1 |
| 4,733,390 | 3/1988 | Shirakawa | 370/105.1 |
| 4,757,502 | 7/1988 | Meuriche et al. | 370/95.3 |
| 4,768,188 | 8/1988 | Barnhart et al. | 370/95.3 |
| 4,773,065 | 9/1988 | Kobayashi et al. | 370/85.1 |
| 4,872,003 | 10/1989 | Yoshida | 370/95.2 |
| 4,882,739 | 11/1989 | Potash et al. | 375/109 |

*Primary Examiner*—Douglas W. Olms
*Assistant Examiner*—H. Kizou

[57] ABSTRACT

A Synchronous Multiport Digital Communications Network (SMDCN) including a HEAD end Unit (HEADU) and SUBscriber Units (SUBU) providing a large number of simultaneous isolated two-way dial-up digital communications channels between a common head end facility and a large number of subscriber facilities over a broadband transmission medium such as coaxial cable or optical fiber arranged in a bus or tree topology, such as a local area network (LAN) or a cable television (CATV) network. The basic digital channel provided is a 64,000 bit per second data stream, the current standard of the digital telephone industry's T1 technology, and therefore readily accommodates voice telephone services. However, the network expressly accommodates higher bit rates up to 1.544 MB/s by combining basic channels. The SMDCN, through utilization of a novel system-wide synchronization technique, allows the provision of standard digital telephone T1 communications services with subscriber access available on an individual DS0 channel basis to residential and business subscribers over such a network. This allows a CATV system operator to provide telephone and computer networking services and new pay-per-view entertainment services to his subcribers, in addition to the normal video entertainment services, over the same cable. The CATV network thereby becomes a "local loop" providing all the services a local telephone company offers. In addition, in a Local Area Network (LAN) application, the SMDCN provides major improvement over current technologies in utilization of transmission medium bandwidth, accommodating a larger number of users over a significantly longer network.

7 Claims, 12 Drawing Sheets

SYNCHRONOUS MULTIPORT DIGITAL 2-WAY COMMUNICATIONS NETWORK USING T1 PCM ON A CATV CABLE

CROSS REFERENCE TO RELATED APPLICATION

Patent Disclosure No. 212813, SYNCHRONOUS MULTIPORT CARRIER NETWORK submitted to the Commissioner of Patents and Trademarks on Oct. 24, 1988.

RIGHTS TO INVENTIONS MADE UNDER FEDERALLY-SPONSORED RESEARCH AND DEVELOPMENT

None

BACKGROUND OF THE INVENTION

In recent years a number of systems have been developed to provide two-way data communications between computers and computer-support equipment installed throughout a building or a group of buildings within a local area. These systems are generally known as Local Area Networks (LANs). One popular implementation of a LAN is the "bus" topology, in which a communications medium or "bus" is routed along a path running near each user station, and a short "stub" branches off the main bus to connect to the station.

With current technology, there are two major shortcomings to LANs implemented in such a bus topology: 1) as the total length of the bus becomes longer and the number of users increases, the efficiency of the network decreases because only one user can be allowed to transmit on to the bus at any time; and 2) due to the asynchronous manner in which the bus access is allocated to each user, the network cannot provide voice telephone services. The invention is intended to improve upon this situation.

Another common network to which the invention is addressed is the CAble TeleVision (CATV) network. The CATV network topology can be described as a "tree", where central system equipment connects to the "trunk" of the tree, which then extends out towards the subscriber sites, splitting off into "branches" along the way, which in turn split into more branches as more users are connected. Amplifiers are installed along the way to compensate for signal losses. In the typical cable TV application, signals originate in the head end and travel in one direction only—"downstream" on the cable toward the subscribers.

CATV networks service a large and increasing number of homes and businesses in the United States. Computers are installed at many of these locations and the need to provide data communications services to these computers is increasing. In addition, voice telephone services are typically required at these locations. Some CATV operators have experimented with two-way communications over the cable for "pay-per-view" television programming and "home shopping" services, but these have not proved to be economically viable. Due to the limitations of current technology, CATV network operators are generally unable to offer full duplex (two-way) voice and data communications services to their subscribers because a feasible, cost effective technology for implementation of dial-up two-way digital services over the CATV cable has not been available.

It is noted that current technology does exist for providing dedicated point-to-point two-way digital communications over coaxial cable systems. This is done by "splitting" the cable bandwidth into an upstream and a downstream frequency band, one allocated to signal transmission in each direction, and transmitting suitably modulated RF carriers in each direction over the cable. A common implementation of this type of system uses the digital telephone technology known as "T1" to provide digital voice/data services to clients requiring 20 or more voice-equivalent channels between two fixed points on the cable. The "T1 channel bank" is a synchronous time division multiplex technique which combines 24 digital channels into a single bit stream at 1.544 MB/s.

However, this technology is not cost-effective for providing services to large numbers of independent subscribers distributed randomly down the cable who individually require only 1 or 2 voice or data channels on a dial-up basis, because there is no way to allocate the 24 channels of one upstream T1 channel bank to different subscribers located at different places along the cable. The reason is that current technology does not accomplish the synchronizing of all transmissions in the upstream direction from a plurality of subscribers with the downstream T1 format, as does the invention.

SUMMARY OF THE INVENTION

It is a general object of this invention to provide a means of implementing a communications network capable of providing a large number of simultaneous, independent, isolated, two-way, dial-up, digital communications channels between a central system facility and a plurality of remote user facilities, over a transmission medium typically arranged in a tree or bus topology, where a plurality of such users can directly and independently couple to the transmission medium and access the network. Further, it is a specific object of the invention to provide a means of implementing such a network using the currently installed CATV network cable as one embodiment of the transmission medium, in a manner to allow a CATV operator to offer his subscribers data communication and voice telephone services in addition to the entertainment services currently offered.

Another object of this invention is to provide a means for implementing a LAN providing improved computer networking services to a significantly increased number of users and extending over a larger service area than current LAN technology allows.

Another object of this invention is to provide a means for implementing a LAN which is capable of providing voice telephone services in addition to computer networking services.

The concept upon which the invention is based, and which makes the abovementioned objects achieveable, is that signal bursts can be transmitted onto a transmission medium by a plurality of transmitters using the same baseband or carrier frequency channel simultaneously, and these bursts can be present on the transmission medium simultaneously without interfering with each other, as long as each burst occupies a different physical location on the transmission medium at any instant in time. The SYNCHRONOUS MULTIPORT DIGITAL 2-WAY COMMUNICATIONS NETWORK (SMDCN) invention utilizes a novel network-wide synchronization concept which causes all users' transmissions to meet this criterion.

In current digital communications networks, this concept is not utilized. In fact, in current networks considerable effort and expense is expended to guarantee that just the opposite occurs, i.e., that the transmitted signal of only one user occupies the entire transmission channel at any instant in time. This means that when a user transmits, no other user can be allowed to transmit until enough time has elapsed for the first user's transmission to travel the entire network and dissipate into the network terminations. Otherwise, interference between two or more transmissions will render all illegible at the point of reception. The unique synchronization scheme utilized in the SMDCN invention prevents such interference.

Now, several implementations of equivalent synchronization schemes have been described in the prior art. However, none of these systems will provide all the features of the current invention, especially the ability to implement two-way, dial-up, voice/data communications, with all the convenience of a common telephone system, over a CATV cable network. Most have been described strictly in the digital baseband domain, where line losses and distortions were not considered or accommodated. In others, the system has to be shut down while certain set-up adjustments are made, or every time the system configuration (number or location of remote stations, for example) is changed.

Further, the systems described in the prior art will in general not work in the case of a network extending transmission over several miles, especially a CATV network utilizing modulated-carrier signals and including many stages of amplification in both directions. These designs do not accommodate all the idiosyncracies of the CATV transmission medium. In addition, none of the prior art is directly compatible with T1 PCM technology, which has become a standard in the telecommuniciations industry. Therefore, one of the prime improvements offered by the current invention is the direct application of T1 technology in its implementation. Further, the current invention includes the following two features not covered in the prior art to solve problems which arise in implementation of 2-way digital communications over long CATV cable networks:

Automatic Gain Control

The concept in the automatic gain control (AGC) feature which is not taught in the prior art is the concept of storing in the head end unit the required gain value for each time slot of a synchronous format, to be recalled and applied to the receiver precisely as the signal burst from each remote subscriber unit arrives in its synchronous time slot. In addition, this gain value for each time slot is updated by one count at the end of the burst, so when the next burst is received from the same transmitter one frame later, any error in the AGC value is decreased. In essence, the AGC value required for each time slot tracks the level of the signal received from each remote unit independently. In the case of the described invention using a T1 data stream, there are a total of 24 AGC values stored in the head end unit simultaneously and continuously tracking 24 independent remote transmitters (when all channels are in use).

The need for such storage and synchronous recovery within the central station or head end unit of the AGC value for each time slot, and update of such AGC values on a frame-to-frame basis, is not recognized in the prior art. While schemes for synchronizing clocks and data streams between a central unit and a plurality of remote units virtually identical or equivalent to that described in the current invention is described in the prior art, none recognize the major significance of the signal deterioration problem over long transmission paths. Nor do they try to accommodate it, as does the current invention.

Closed-Loop Clock Synchronization

The current invention requires precise synchronization of clocks between the central head end and remote stations. The described new mechanization for this is conventionally detecting the phase error for each remote station at the head end and transmitting the required phase correction information to it over the FDL channel of the T1 link, thereby creating a phase-lock-loop between units separated by several miles of cable.

One embodiment of the SMDCN invention is described herein, which provides a plurality of simultaneous, isolated, independent, two-way, dial-up digital communications channels between a central "head end" facility and a large number of remote "subscriber" facilities over a transmission medium arranged in a "tree" topology, where all reference herein to a tree topology includes the aforementioned bus topology, in that the tree becomes a bus if the branches are constrained to relatively short lengths that do not themselves split into more branches. In the described primary embodiment, the transmission medium used is a coaxial cable, such as is used in CATV networks, and hereafter the transmission medium will be generally referred to as "cable" in the discussion.

The subscriber facilities are totally independent of each other, couple signals directly to and from the cable, can be located at any point along the cable where suitable coupling means are provided, and communicate directly with equipment at the head end of the cable.

A second embodiment is also described in which the SMDCN is applied to a fiber optic network. The technology to provide video, data, and telephone services to business and residential subscribers over fiber optic networks is developing rapidly. Currently, some telephone companies are operating such networks on an experimental basis. In these systems the central office switches the selected program material in high-speed digital form down the fiber to each subscriber on request. The request is made via an upstream channel, and this requires a second separate fiber from each subscriber to the central office. The topology of these installed networks is therefore a "star" in which at least two fibers runs from a central office to each subscriber.

A considerable cost savings could be achieved if a "tree" or "bus" topology were used, where a large number of subscribers share the same pair of fibers. However, bus topology fiber optic systems of current design suffer the same limitations as LANs discussed above, i.e., a rapidly diminishing performance level as the number of users and the length of the bus increases. The application of the new synchronization architecture of the SMDCN invention to fiber optic networks overcomes that problem and makes the bus topology feasible.

The SMDCN apparatus consists of two items—the HEAD END UNIT (HEADU), and the SUBSCRIBER UNIT (SUBU). The HEADU is installed at the SMDCN system operator's head end facility, and connects to the "head end" of the cable. A SUBU connects to the cable at each subscriber's facility. The HEADU and SUBUs transmit and receive signals over the cable, using a synchronous data format and a unique and novel synchronization scheme which causes a system-wide synchronization of all transmissions onto the cable, thereby providing a plurality of simultaneous, independent, isolated 2-way communications channels between the head end facility and subscribers located along the cable.

Additional conventional digital telecommunications switching equipment connected to the HEADU at the head end facility provides for setting up communication channel "connections" or "calls" between two or more subscribers coupled to the same cable, or extending these connections to the public telephone network, long distance carriers, or other private communications networks. Similarly, additional conventional equipment including, but not limited to, a digital telephone, television "cable box", or computer, may be connected to the SUBU at each subscriber facility to provide voice telephone service, interactive entertainment TV services, computer networking, security monitoring, and other services.

DESCRIPTION OF THE INVENTION

Definitions

The following terms are hereby defined as employed herein:

Signaling—the process in the telephone industry of sending call command and/or progress information such as ringing, busy, ringback, or other information concerning setup or clear-down of calls or connections (signaling information) over the network.

Robbed-bit Signalling—the technique of "robbing" the least significant bit from certain data words in a telephone T1 PCM system and using it to convey signaling information rather than voice information over the network.

Time sequence integrity—the time sequence integrity of data is maintained by a network if each data word or sample of a signal emerges from the output of the network in the same time sequence as it entered the input of the network in relation to all other data words or samples of the signal.

Source integrity—the source integrity of data is maintained by a network if the source of the data can be identified as the data emerges from the output of the network.

NETWORK TOPOLOGY

Figure 1:
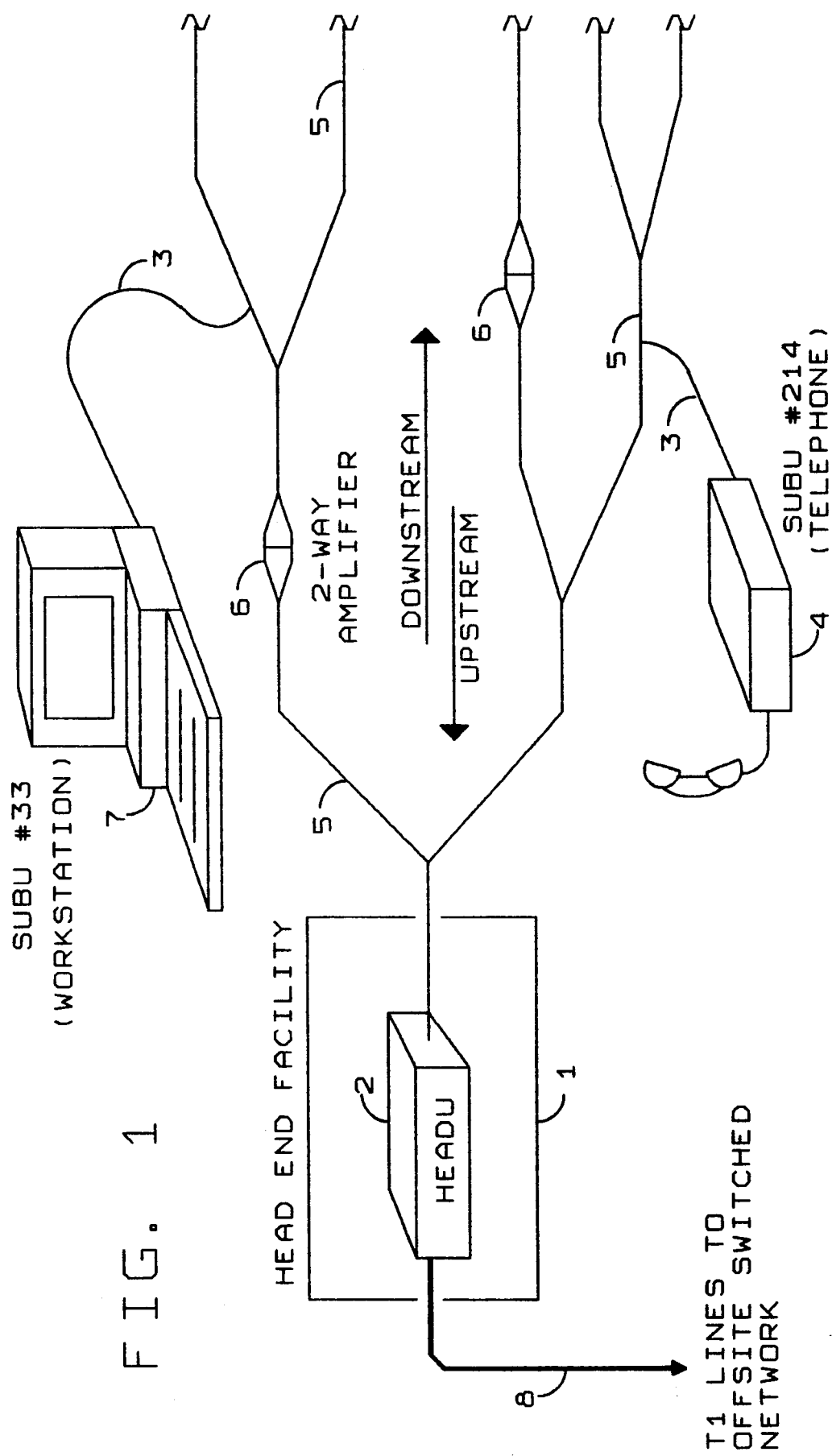
FIG. 1 is a system-level block diagram showing the network topology and the basic HEADU and SUBU components of the SMDCN invention as described and applied to a cable television network.

Referring to the drawings, wherein like reference characters designate corresponding parts throughout the several figures, FIG. 1 is a top-level diagram of the described embodiment of the entire SMDCN network, showing the SMDCN apparatus and the "tree" topology in the specific case of a CATV network. While the transmission medium may in general be any broadband transmission medium, including coaxial cable, balanced twinlead, twisted pair of wires, waveguide, optical fibers, a free space medium such as a microwave or laser beam, or even a free space medium using a broadcast technology, in the described embodiment a wideband coaxial cable is chosen, with bandwidth extending from 30 to 500 MHz. The total length of the network transmission medium may extend 20 miles or more. However, some design parameters are dependent on the maximum length of the network, so the specific implementation described herein is limited to a maximum length of 20 miles.

Referring to FIG. 1, the network consists of the head end equipment (HEADU) 2 connected at the "trunk" end of the cable at the head end facility 1. The cable 5 extends out from the head end facility and like a tree, divides into two or more branches, which themselves divide into more branches. Two-way amplifiers 6 may be installed along the cable to compensate for signal attenuation, but in short networks up to a kilometer or so in length, may not be required. The SUBUs 4 and 7 are connected at the subscriber facilities at various distances from the head end facility. A SUBSCRIBER CABLE DROP 3 connects each SUBU to the branch of the cable 5 running nearest the subscriber facility, using conventional CATV coupling means. A large number of SUBUs can be serviced by the single HEADU, depending on system design parameters and the bandwidth on the cable assigned to the SMDCN application. A bandwidth of 200 MHz, for example, assigned to the SMDCN service, could service 10,000 SUBUs or more.

A number of different kinds of SUBUs are contemplated for providing the subscriber with different services. Two of these are shown in FIG. 1, a telephone SUBU 4 with identification number 214, and a computer workstation SUBU 7 with identification number 33. Variations in the conventional circuitry in the different types of SUBUs is to be expected to accommodate the different functionality, however, the interface and operation of all the SUBUs with respect to the network is identical, and is described herein for the telephone-type SUBU 4, which is both the simplest to understand in terms of function, and at the same time the most difficult to implement over the defined network, due to the real-time nature of voice communications.

The basic communications channel provided by the SMDCN invention is an independent, isolated, 64 KB/s serial data stream in both directions between the HEADU and each active SUBU. The channels is normally dial-up in nature, meaning that a SUBU can be in an off-hook or on-hook state like a telephone, and the network provides setup and cleardown of a connection or call like a telephone system. The HEADU then provides means of extending the channel to offsite service providers, such as long distance telephone carriers, the public switched network, data communications networks, etc, via standard telephone industry T1 lines 8.

RF COMMUNICATIONS

Figure 2:
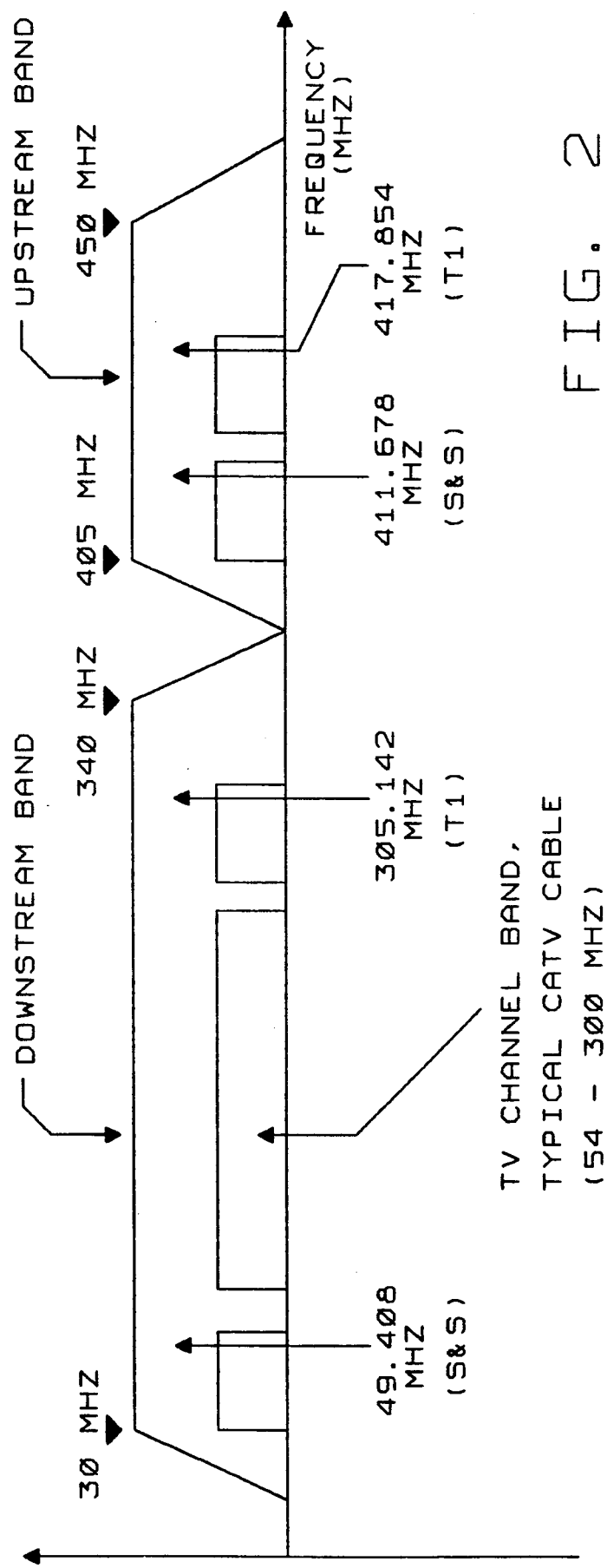
FIG. 2 is a chart of the radio frequency spectrum typically available on a cable television network, showing the frequencies allocated to the SMDCN invention.

A frequency band on the cable is assigned for the downstream communication path from HEADU to SUBUs, and another band is assigned for the upstream path from SUBUs to HEADU. The bandwidth requirement of the upstream and downstream bands is determined by the number of subscribers to be accommodated (the number of SUBUs connected), as well as the mix of subscriber applications, i.e. business vs. residential and data vs. voice. In the implementation described, the cable system splits the bands at about 370 MHz, i.e. the downstream band is assigned 30 to 340 MHz and the upstream band is assigned 405 to 450 MHz, as shown in FIG. 2. This particular bandsplit and the operating carrier frequencies specified herein are chosen only to make the described embodiment directly applicable to a typical conventional CATV network, in which the downstream frequency band is already occupied by entertainment television signals from 54 to 300 MHz. In other applications where no competitive useage of the cable bandwidth exists and a free selection of frequencies for the SMDCN is possible, a different bandsplit and frequency assignment may be used to simplify the design, improve the performance, and/or reduce the cost of the equipment. The bandsplitting of the cable is accomplished, as in a conventional two-way CATV network, by filters installed as part of the amplifiers 6. In short networks where no amplifiers are required, the cable is simply a passive transmission medium passing all frequencies in either direction.

In the described embodiment, the communication links over the cable consist of 2 downstream RF channels and 2 upstream RF channels, implemented using frequency division multiplexing, i.e., each channel operates on a different carrier frequency, and so is isolated and independent, and does not interfere with any other while simultaneously sharing the same physical cable. Lower vestigial sideband amplitude modulation of the carriers is used. However, other more sophisticated and costly modulation techniques could be applied to further improve the efficiency of bandwidth usage and thereby service more subscribers for a given bandwidth allocation.

There are two modes of communication between the HEADU and SUBUs of the SMDCN —a Synchronization and Signaling (S&S) mode, and a T1 data transmission (T1) mode, each described in detail below. Each SUBU communicates with the HEADU in the S&S mode whenever it is "onhook", i.e., connected to the cable and powered up, but inactive, (like a telephone that is "on hook"). the HEADU is continually communicating with all the "onhook" SUBUs on the entire network, in order to maintain their synchronization and to communicate signaling information (like "ringing" of a telephone) to them. When a SUBU is "offhook", i.e., active (like a telephone that is in use, or "off hook") it operates in the T1 mode.

One upstream and one downstream channel-pair are dedicated to the Synchronization and Signaling (S&S) function. In order to simplify the discussions following, only one other channel-pair is utilized in the described embodiment, and this is dedicated to a single 2-way T1 data link. In a commercial system, any number of additional T1 channel-pairs could be added by conventional frequency division multiplexing techniques to increase the number of subscribers that can be serviced, limited only by the total allocated bandwidth on the cable. Only one S&S channel-pair is required, regardless of the number of T1 channel-pairs.

The assigned frequency allocations are the following:
Downstream T1: 305.142 MHz
Downstream S&S: 49.408 MHz
Upstream T1: 417.854 MHz
Upstream S&S: 411.678 MHz

T1 MODE

The T1 mode will be described first because it defines the basis of the system synchronization requirements. For the purpose of the following T1 mode operational description, it is assumed that the SUBU has already completed the S&S operation, is synchronized with the HEADU, and has been tuned to transmit and receive on the T1 channel-pair.

The T1 mode uses the standard telephone T1 or DS1 digital data transmission scheme which is the basis of the digital telephone industry in the United States and is well-documented in the technical literature. "T1" and "DS1" are terms used in the telephone industry to designate a specific subset of formats of a serial digital transmission scheme known as Synchronous Time division Multiplexing, commonly abbreviated to STM. STM uses a serial bit stream with a synchronous data format known as a "synchronous time division multiplex format" in which the position of a data word and/or bit with respect to the begining of a predetermined, repetitive data "frame" and "superframe" identifies the word and/or bit with respect to its source and/or destination. The beginning of each frame and superframe is identified by special patterns of framing bits within the format.

The SMDCN invention takes advantage of the synchronous characteristics of STM systems, and can be designed to utilize virtually any STM format. However, the T1 format is chosen for the described implementation due to its wide acceptance in and compatibility with the digital telephone industry, and the ready availability of a number of standard T1 integrated circuits from several manufacturers. This expedites the system design and implementation. General T1 information and specifications on specific integrated circuits utilized in the described implementation is available in the "MICROELECTRONICS DATA BOOK, ISSUE 5, Copyright 1988", published by Mitel Corporation.

Figure 3:
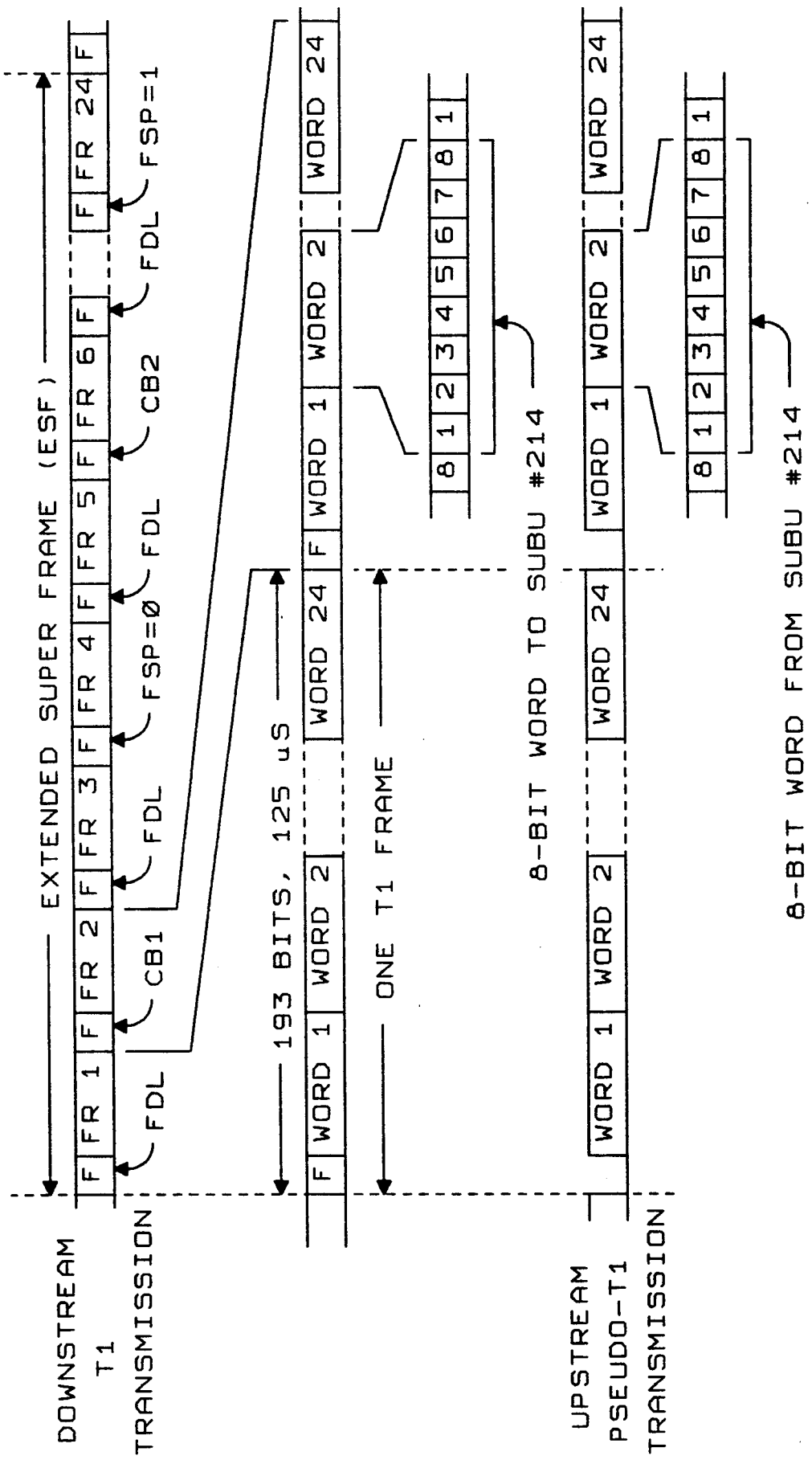
FIG. 3 is a diagram showing the format of the standard telephone T1-/ESF (Extended Super Frame) bit streams utilized by the SMDCN invention.

FIG. 3 shows the T1/ESF (T1 Extended Super-Frame) format, one of a number of similar T1 formats used throughout the telephone industry in the U.S. The T1 "frame" includes 24 "words", each containing 8 "bits" of data, for a total of 192 data bits. A single framing bit is added to each frame, making the total T1 frame length 193 bits. The frame repeats at a rate of 8000 times per second, making the length of each frame 125 microseconds (uS) and creating a serial bit stream of $193 \times 8000 = 1.544$ megabits per second (MB/s). 24 successive frames create a "superframe". Each superframe therefore contains 24 framing bits.

In a conventional telephone trunking T1/ESF application, these framing bits are assigned to provide a frame synchronization pattern (FSP), a 4 KB/s Facility Data Link (FDL) channel and a cyclical redundancy error check (CRC) capability, as shown in TABLE 1 below.

TABLE 1

| FRAME # | FRAMING BIT FUNCTION | | |
|---|---|---|---|
| | FSP | FDL | CRC |
| 1 | | X | |
| 2 | | | CB1 |
| 3 | | X | |
| 4 | 0 | | |
| 5 | | X | |
| 6 | | | CB2 |
| 7 | | X | |
| 8 | 0 | | |
| 9 | | X | |
| 10 | | | CB3 |
| 11 | | X | |
| 12 | 1 | | |
| 13 | | X | |
| 14 | | | CB4 |
| 15 | | X | |
| 16 | 0 | | |
| 17 | | X | |
| 18 | | | CB5 |
| 19 | | X | |
| 20 | 1 | | |
| 21 | | X | |
| 22 | | | CB6 |
| 23 | | X | |
| 24 | 1 | | |

In the SMDCN application, the CRC bits are utilized conventionally to verify data integrity in the downstream transmission, while the FDL channel is used to provide the following signaling and control functions from the HEADU to all SUBUs operating in the T1 mode:

1) Call Cleardown: The HEADU uses the FDL channel to command a SUBU in the data mode to "clear down" and revert to S&S mode at the completion of the call.

2) Fine Synchronization Adjustment: The "fine synchronization adjustment" requires two commands—one to cause the SUBU to increment its frame time by an extra reference clock cycle, and another to cause a decrement in frame time by a single clock cycle. With these two commands, the HEADU can "fine tune" the frame time of each SUBU independently and continuously during the T1 mode operation, and thereby maintain the accuracy of the synchronization of all SUBU transmissions. This operation is further described in the circuit descriptions following.

As stated above, there are 24 8-bit data words in each T1 frame. Successive frames contain a successive sample of the data channel assigned to each word. For example, assume a call has been set up in which WORD 2 of every frame of the downstream bit stream is assigned to SUBU #214 (each SUBU has a unique identification number) installed in a subscriber's facility.

Since the T1 frame rate is 8000 frames per second, the total transmission rate to SUBU #214 is 8 × 8000 = 64,000 bits per second. This is known in the telephone industry as a DS0 channel. Simultaneously, 23 other subscribers can receive data from the same HEADU on the same T1 bit stream using the other 23 words of the T1 frame.

In the HEADU, the downstream T1 bit stream of FIG. 3 modulates the 305.142 MHz downstream RF carrier frequency and this is transmitted down the cable to the SUBUs.

Simultaneously while transmitting this T1 bit stream downstream on the cable, the HEADU receives a "pseudo-T1" bit stream transmitted upstream on the cable at the carrier frequency of 417.854 MHz by up to 24 SUBUs (SUBU #214 plus 23 others), randomly distributed along the cable. Each of these SUBUs transmits an 8-bit burst of modulated carrier on the upstream T1 frequency (417.854 MHz) in its own unique assigned time slot of each frame, precisely synchronized so that the data bursts arrive at the HEADU in the same T1 format as the downstream transmission, and in bit and word synchronization with the downstream transmission. This upstream bit stream is not a true T1 format because it lacks the framing bits. It is therefore designated a "pseudo-T1" bit stream.

This upstream pseudo-T1 bit stream received at the HEADU is also shown in FIG. 3, synchronized in time with the downstream bit stream, just as it is received at the HEADU. As in the downstream transmission, every 2nd word of the each frame is assigned to SUBU #214, but in this case it is a data word transmitted by SUBU #214 to the HEADU.

SYNCHRONIZATION AND SIGNALING MODE

Synchronization: The S&S mode is used to synchronize all SUBUs in the system to the HEADU timing such that the above relationships between the upstream and downstream T1 bit streams are maintained. The S&S mode utilizes a single downstream channel (49.408 MHz) and a single upstream channel (411.678 MHz) on the cable at all times.

All SUBUs go into the S&S mode when first connected to the cable and powered up. Each SUBU has an S&S receiver circuit always tuned to 49.408 MHz, the S&S downstream channel frequency. This receiver constantly generates a reference clock signal phase locked to the transmitted 49.408 MHz carrier from the HEADU. As long as that carrier is being received, this clock increments the SUBU frame time precisely in step with the HEADU frame time. Consequently, once synchronized, the SUBU and HEADU frame time clocks remain synchronized indefinitely.

Figure 4:
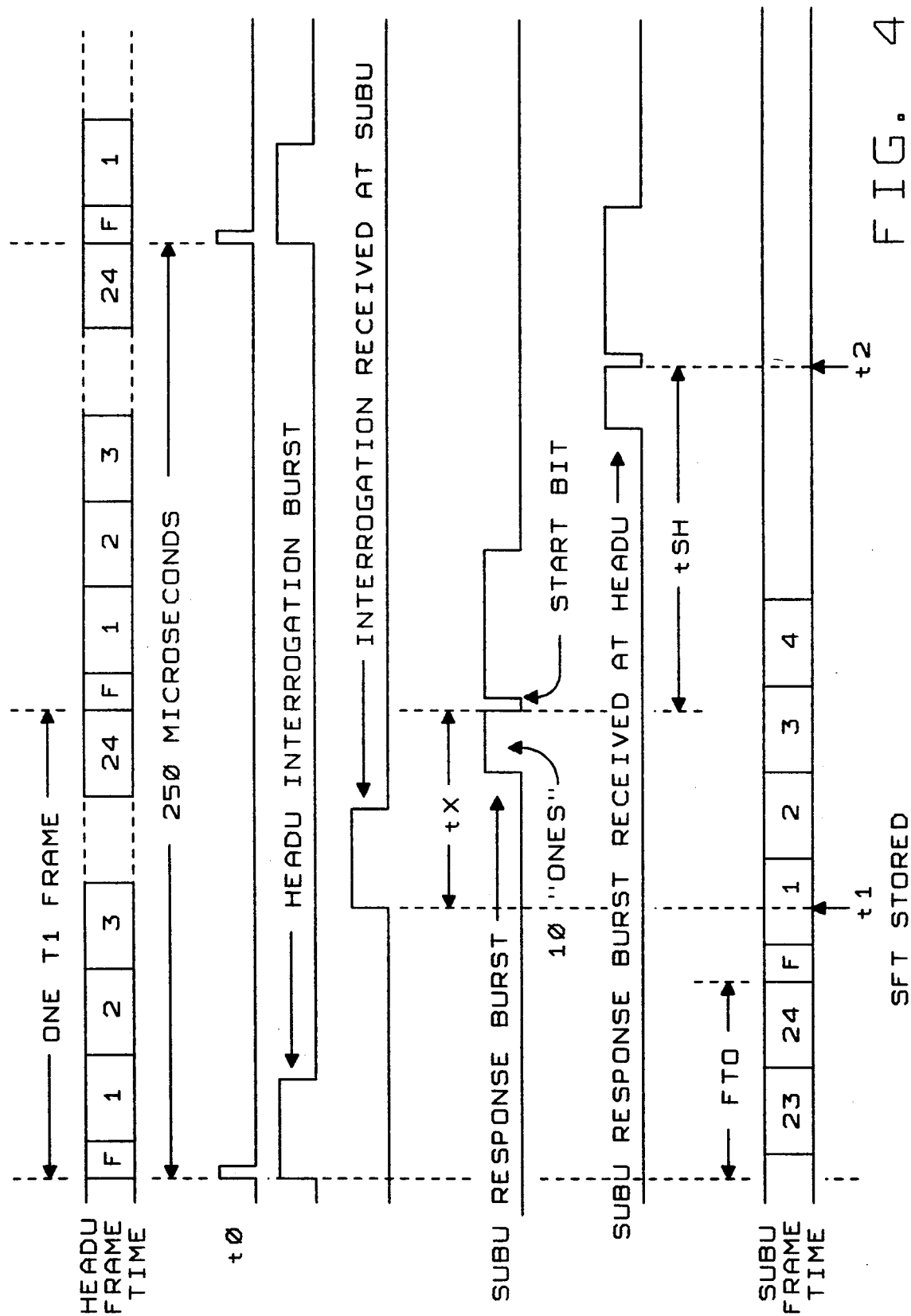
FIG. 4 is a timing diagram illustration of the interrogation and response communication between the HEADU and SUBU which accomplishes the system synchronization.

The initial synchronization is achieved in the S&S mode by a sequence of transmissions between HEADU and SUBU as shown in FIG. 4. The HEADU transmits a burst of data on the downstream channel every 250 microseconds. All SUBUs in the S&S mode receive this burst of data. However, each such burst is designated only for a single SUBU and contains a SUBU Identification (ID) word. Each SUBU has its own unique ID word stored in memory. Only the SUBU whose ID matches the transmitted ID word accepts the data and responds. The synchronization algorithm operates as follows:

1. Every 250 microseconds, at time t0, the HEADU transmits an interrogation data burst on the downstream S&S channel to a specific SUBU, and simultaneously resets a counter, the PATH DELAY COUNTER to zero. The PATH DELAY COUNTER begins incrementing.

2. All SUBUs receive the interrogation burst and store their SUBU Frame Time (SFT) at t1, the time the first bit of the interrogation is received (t1 is different for each SUBU). All SUBUs continue to receive the remainder of the burst, and examine the SUBU ID bits contained within it. All SUBUs whose internal IDs do not match the ID in the received burst terminate response and wait for the next transmission from the HEADU.

3. The SUBU whose ID matches the ID in the burst transmits a response data burst to the HEADU on the upstream S&S channel. This response begins with a 10-bit string of ONES, followed by a ZERO "start bit", the SUBU ID, the stored SFT, and finally a ZERO "stop bit". The "start bit" of this transmission occurs precisely tX seconds after t1, where tX is the SUBU transmission turn-around time, a system design constant known to the HEADU.

4. The HEADU receives the response burst. Precisely at t2, the instant the leading edge of the start bit is detected, the HEADU stores the HEADU Frame Time (HFT) and stops the PATH DELAY COUNTER. On receiving the stop bit, the HEADU then verifies the SUBU ID in the received burst, and if it is correct, stores the SFT from the received burst.

5. The HEADU now calculates the SUBU-to-HEADU transmission path delay (tSH) for the SUBU, assuming the path delay on the cable is equal in each direction. Phase compensation circuitry may be installed in the cable amplifiers if necessary to realize this assumption. Alternatively, any difference in path delay in the upstream and downstream directions can be characterized for each cable type and compensated for in the calculations.

The PATH DELAY COUNTER now contains a count PDC measuring the total 2-way delay, including tX. Therefore the HEADU calculates the one-way delay tSH:

$$tSH = \tfrac{1}{2}(PDC - tX)$$

6. The SUBU Frame Time Offset (FTO) is defined as the frame time count by which the SUBU frame time lags the HEADU frame time, as shown in FIG. 4, i.e., $$FTO = SFT - HFT \text{ (at any instant)}$$

The HEADU calculates this FTO for the specified SUBU as follows:
t1 is the only instant for which the SFT is known by the HEADU, so the HFT at t1 is first calculated:

$$[HFT]t1 = [HFT]t2 - tX - tSH$$

therefore, $$FTO = SFT - ([HFT]t2 - tX - tSH),$$

or $$FTO = SFT - [HFT]t2 + tX + tSH$$

7. The HEADU maintains the two parameters FTO and tSH in memory for each SUBU. Since the frame time clocks of all SUBUs are phase-locked to the HEADU frame time clock, the FTO remains constant for as long as the SUBU remains connected, powered up, and receives the 49.408 MHz downstream S&S carrier signal. Consequently, if the path delay were a function only of the length of cable and the delay in the amplifiers on the cable between the units, tSH, ideally, would also remain constant, and no more synchronization activity would be required.

However, in the real world, some variation of tSH will occur with temperature changes of the cable and amplifiers. Consequently, the synchronization procedure is continually repeated with all the onhook SUBUs being addressed in sequence. When the last SUBU is so synchronized, the HEADU repeats the process beginning again with the first. This continual S&S activity produces a new value for FTO and tSH for each SUBU every 20 seconds or less, depending on the total number of SUBUs in the system. An algorithm in the HEADU software compares successive calculated values of FTO and tSH for each SUBU, and if excessive change in either is detected, a malfunction of the SUBU or the system is indicated, and appropriate measures are invoked.

When a SUBU goes offhook and requests a data channel, the HEADU uses the stored values of FTO and tSH to calculate and assign a transmission time slot in the SUBU format, which results in the SUBU transmitted data word arriving at the HEADU receiver synchronous with the correct time slot of the HEADU format. When 24 SUBUs transmit in their own assigned time slot in this synchronous manner, the HEADU receives the pseudo-T1 bit stream shown in FIG. 3, in perfect synchronization with the outgoing downstream T1 bit stream.

Signaling: Signaling is accomplished in the S&S mode after synchronization is complete. There are two signaling functions:

Channel Request: an onhook SUBU goes offhook and requests the HEADU to assign a data channel. To accomplish this, the SUBU replaces the SFT in the response burst with a unique data pattern which is recognized by the HEADU as a channel request, and Ringing: the HEADU "rings" a SUBU, just like a telephone. To accomplish this, the HEADU inserts a data pattern in the interrogation burst which both rings the SUBU, and also assigns one of the 24 word slots for SUBU transmission. (in addition, in an expanded system, where a number of RF channel-pairs are used for multiple T1 links, a command to tune the SUBU receiver to the designated channel would be included in this transmission burst.)

HEADU CIRCUIT DESCRIPTION

Figure 5:
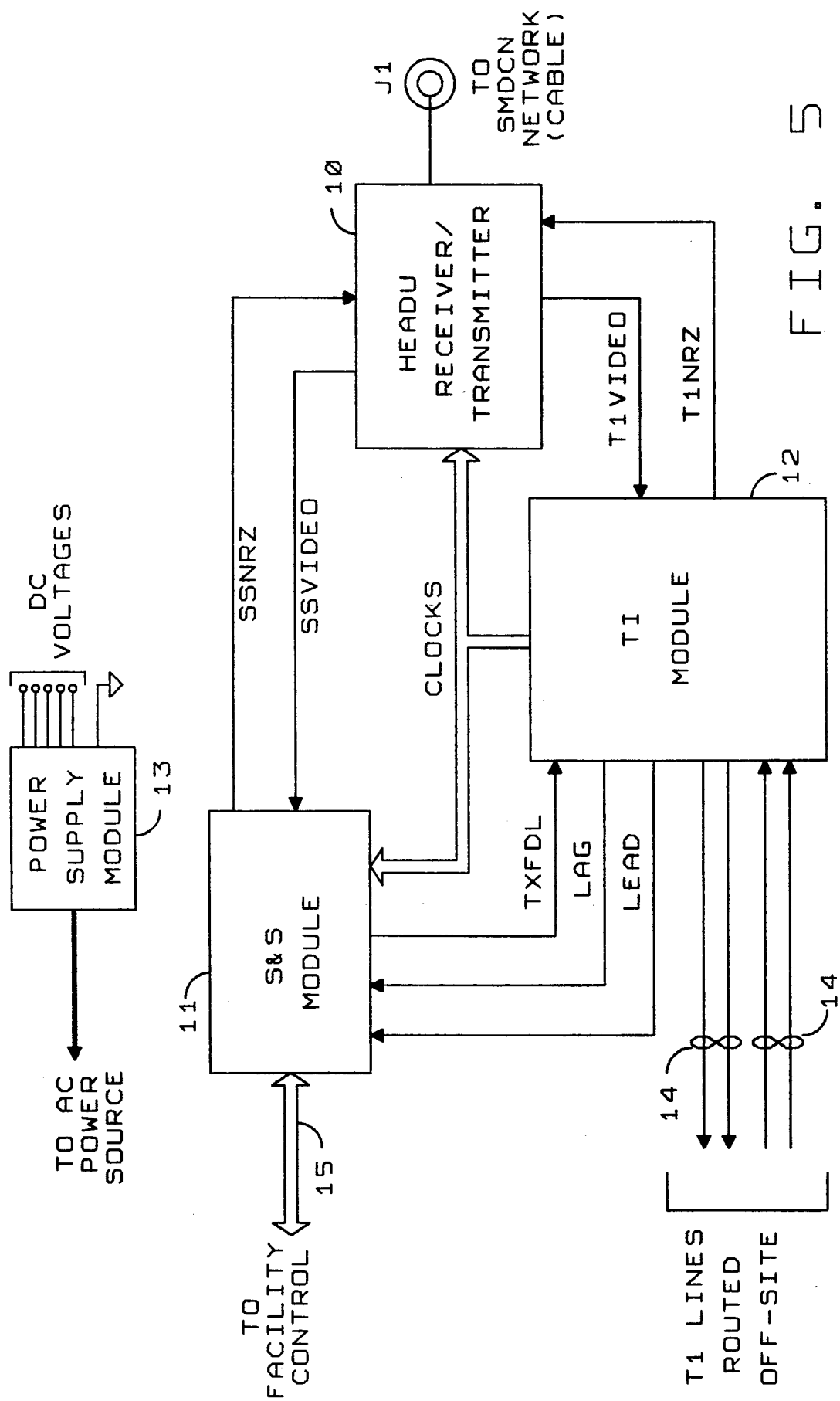
FIG. 5 is a block diagram of the HEADU, showing the major circuit modules.

Referring to the block diagram of the HEADU 2 illustrated in FIG. 5, the HEADU consists of the four major modules, the HEADU RECEIVER/TRANSMITTER module 10, the S&S MODULE 11, the T1 MODULE 12, and the POWER SUPPLY MODULE 13. The POWER SUPPLY MODULE, for the purposes of this embodiment, is a commercially available module which connects to a standard AC power line, meets all applicable governmental and industry regulations and generates all the low DC voltages required by the HEADU circuitry. The RF connection to the cable is made through connector J1. The connection to offsite telecommunications services is made through two pairs of T1 lines 14.

HEADU RECEIVER/TRANSMITTER MODULE

Figure 6:
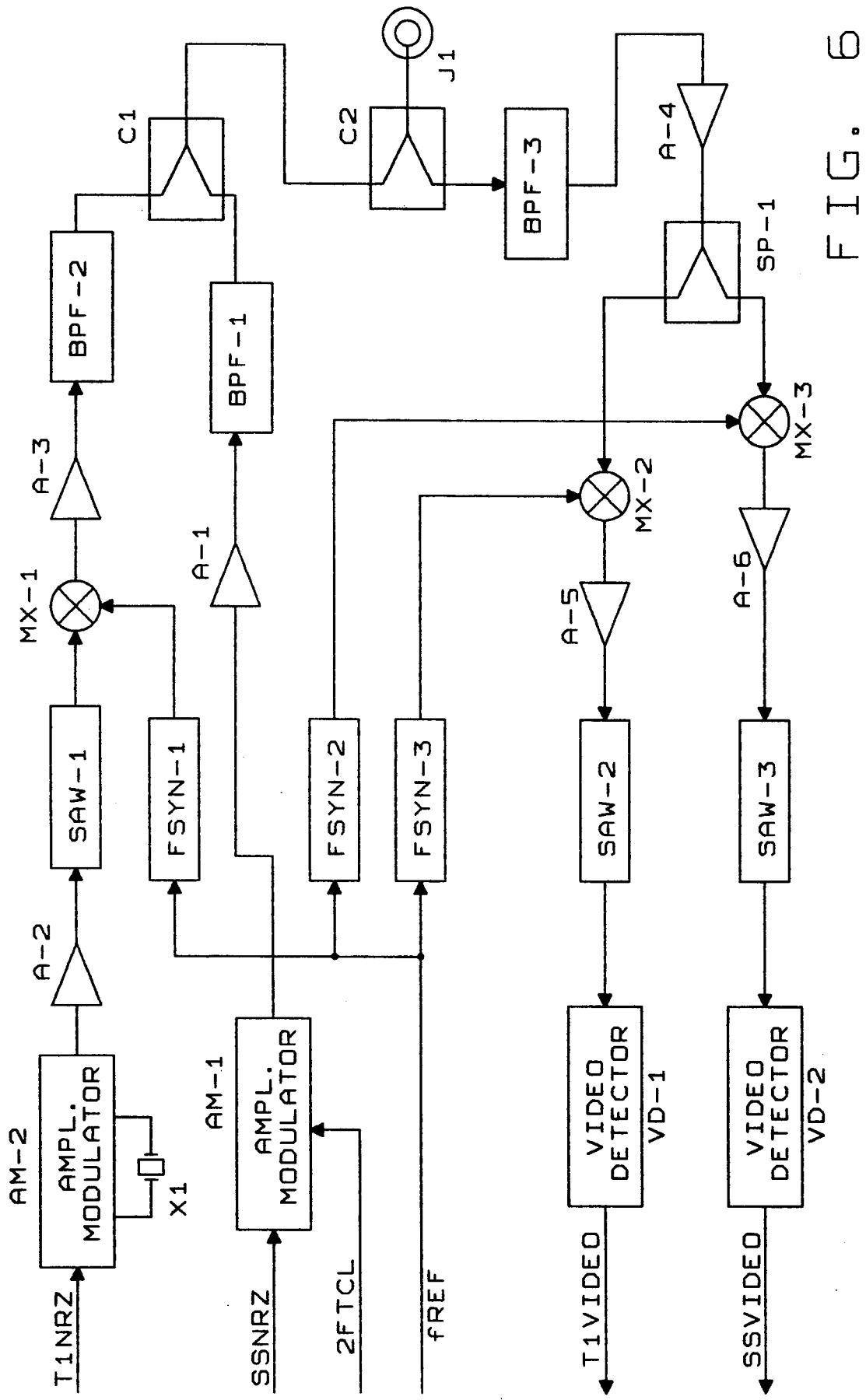
FIG. 6 is a detailed block diagram of the HEADU RECEIVER/TRANSMITTER module.

The HEADU RECEIVER/TRANSMITTER module 10 is further illustrated in detailed block diagram FIG. 6. Three frequency synthesizers FSYN-1, FSYN-2, and FSYN-3, are phase-locked to a 24.125 KHz reference clock signal fREF, and generate precision frequency signals for upconversion in the transmitter and downconversion in the receivers, as listed below:

FSYN-1: 234.688 MHz for T1 channel transmitter upconversion

FSYN-2: 365.928 MHz for S&S channel receiver downconversion

FSYN-3: 372.104 MHz for T1 channel receiver downconversion

The reference frequency fREF is generated by the pLL MASTER CLOCK circuit in the T1 MODULE, described below. The three frequency synthesizers are identical, except for internal divider ratios which determine the output frequency, to the frequency synthesizers in the SUBU, also described in detail below, with reference to FIG. 11.

The S&S transmitter includes an amplitude modulator circuit AM-1 which accepts as input SSNRZ, the outgoing S&S data burst in NRZ (Non-Return-to-Zero) code from the S&S MODULE described below. AM-1 uses the 49.408 MHz clock 2FTCL as a carrier input and modulates this with the data burst. The modulator output is amplified in amplifier A-1 and filtered by bandpass filter BPF-1. This filter has a bandpass from 43 to 50 MHz, and passes only the lower sideband, the carrier, and a small portion of the upper sideband, providing a lower vestigial sideband transmitted signal, which is coupled to connector J1 and thereby to the CATV cable via 2:1 RF combiners C1 and C2.

The T1 transmitter includes amplitude modulator circuit AM-2 which accepts as input T1NRZ, the outgoing T1 data stream in NRZ code from the T1 MODULE described below. AM-2 contains an internal crystal oscillator circuit and generates its own carrier signal using 70.454 MHz crystal X1. The resulting modulated signal is amplified by amplifier A-2, then filtered by bandpass filter SAW-1. This filter is a Surface Acoustic Wave (SAW) bandpass filter designed for a channel 4 television transmitter, with bandpass from 66 to 72 MHz. In our application, it passes the lower sideband, carrier and a small portion of the upper sideband of the modulated signal, providing a lower vestigial sideband modulated signal. The output of the filter is upconverted in mixer MX-1 by mixing with the 234.688 MHz signal from FSYN-1, resulting in a transmitter carrier frequency of 305.142 MHz. This carrier is amplified in amplifier A-3, bandpass filtered in BPF-2 to remove unwanted harmonics and mixer products, and coupled to J1 and thereby the CATV cable via RF combiners C1 and C2.

Referring still to FIG. 6, the 2 upstream carriers from the cable enter the HEADU at J1 and are routed to bandpass filter BPF-3 which has a 20 MHz bandwidth at center frequency of 412 MHz. This filter prevents out-of-band high-level signals which may be on the cable from reaching and overloading the receiver circuits. The signals are routed thru amplifier A-4, split into two paths by 2:1 RF splitter SP-1, and routed to the two mixers MX-2 and MX-3. MX-2 mixes the received RF signal with the 372.104 MHz "local oscillator" signal from FSYN-3, producing the T1 channel IF signal at 45.75 MHz. Similarly, MX-3 mixes the received RF signal with the 365.928 MHz local oscillator signal from FSYN-2, producing the S&S channel IF signal, also at 45.75 MHz.

The two IF signals are routed through amplifiers A-5 and A-6 to SAW filters SAW-2 and SAW-3, respectively The SAW filters are standard television receiver IF filters, designed to pass the lower vestigial sideband of a 45.75 MHz video IF signal. The outputs of the SAW filters are routed to VD-1 and VD-2 which are standard television receiver video detector integrated circuits such as National Semiconductor LM1823. These circuits recover the S&S and T1 upstream baseband data in NRZ form. These two data streams, SSVIDEO and T1VIDEO, are routed to the S&S MODULE 11, which performs the synchronization and signaling, and the T1 MODULE 12, which performs the T1 data handling, respectively.

HEADU S&S MODULE

Figure 7:
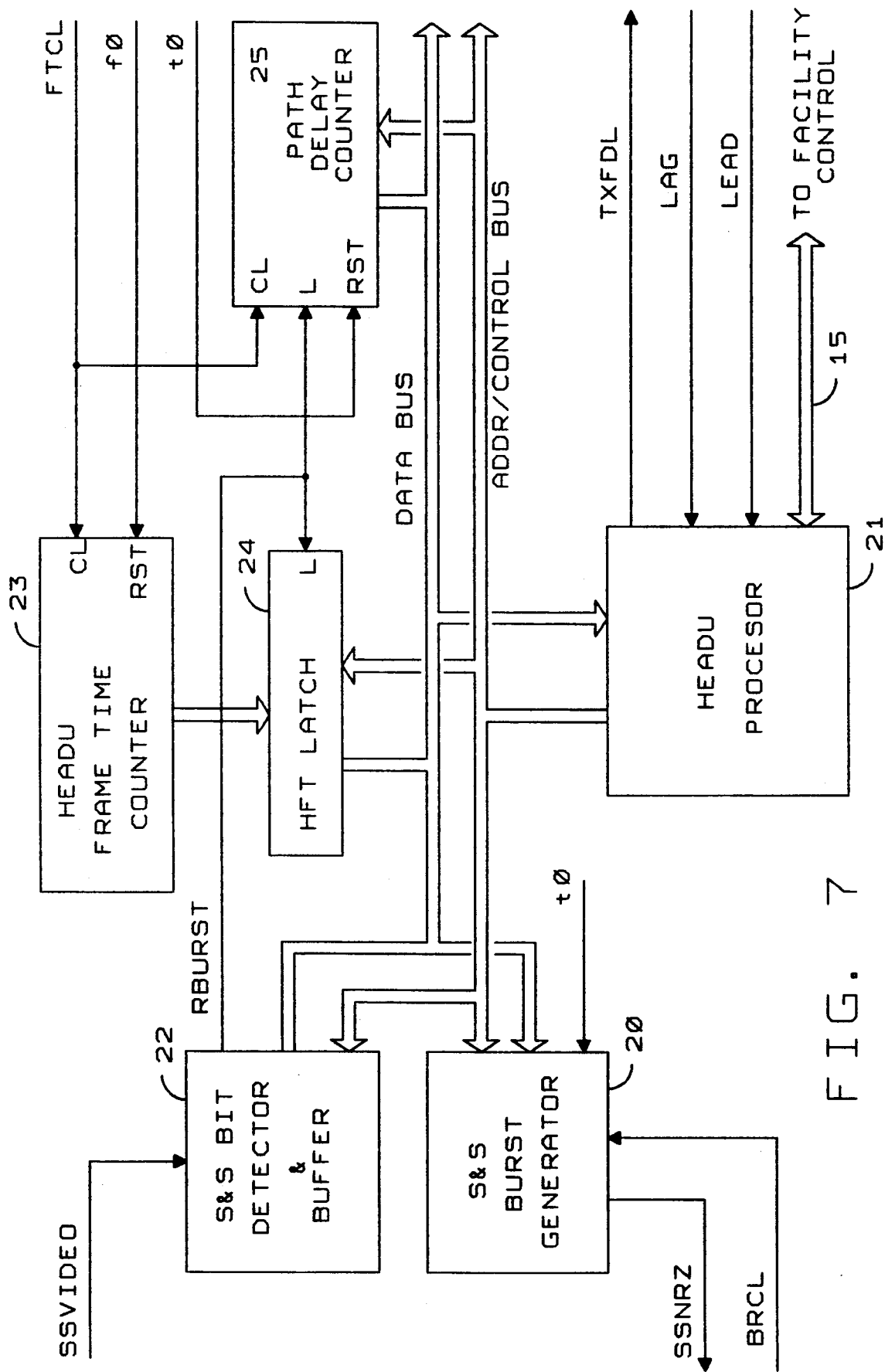
FIG. 7 is a detailed block diagram of the HEADU S&S MODULE.

Referring to FIG. 7, a detailed block diagram of the HEADU SYNCHRONIZATION AND SIGNALING MODULE (S&S MODULE) 11, the S&S BURST GENERATOR 20 generates the baseband NRZ data burst SSNRZ that modulates the carrier transmitted downstream to the SUBUs on the S&S channel. The S&S BURST GENERATOR circuit consists of a 32-bit parallel-to-serial conversion register and a 31-bit counter. The register is parallel-loaded with two 16-bit data words by the HEADU PROCESSOR 21. These words contain the SUBU ID and a SUBU command function. When the t0 pulse occurs, the bit rate clock BRCL begins clocking the serial data out of the register on the SSNRZ line at the 1.544 MB/s rate. When 31 bits have been clocked out, the clock is disabled, and the last bit, always a "ONE" (representing a 100% carrier level out of the modulator), remains on the SSNRZ line until the next burst is due. These outgoing data bursts are generated every 250 microseconds, as described previously.

The S&S BIT DETECTOR & BUFFER circuit 22 accepts as input the SSVIDEO signal containing the reponse data burst from the interrogated SUBU. This data burst begins with a 10-bit string of ONES, representing a 100% carrier level at the receiver input, to which an automatic gain control (AGC) loop in the video detector circuit locks. The S&S BIT DETECTOR & BUFFER ignores the beginning of the burst, as some bits may be noisy while the AGC loop is settling out, then looks for 4 consecutive bits of ONES followed by a ZERO. This ZERO is the start bit. When this one-to-zero transition is detected, an RBURST signal is raised. The rising edge of RBURST causes the HEADU Frame Time LATCH (HFT LATCH) 24 to store the instantaneous value of the HEADU FRAME TIME COUNTER 23 and stops the PATH DELAY COUNTER 25, which at the same instant latches and stores its current count representing the round-trip path delay between HEADU and the interrogated SUBU.

During the time RBURST is high, the 30 data bits of the received data burst on the SSVIDEO line are clocked into a serial-to-parallel conversion register in the S&S BIT DETECTOR & BUFFER 22, where they are held until the next SUBU burst arrives 250 microseconds later, and the process repeats. Before this occurs, this 30 bit parallel output holds the SUBU ID and the SUBU Frame Time (SFT) information, for access by the HEADU PROCESSOR during its calculation of the synchronization algorithm, as described previously in the S&S Mode description.

The HEADU FRAME TIME COUNTER 23 maintains the master frame time reference of the T1 data format for the entire system. The counter consists of 12 bits, divided into groups as follows: the least significant 4 bits for fractions (sixteenths) of a bit period, the next 3 bits for bits/word, and the upper 5 bits for words/- frame. The maximum count for each group is 15 fractions, 7 bits, and 23 words. The HEADU FRAME TIME COUNTER is incremented by the 24.704 MHz frame time clock signal FTCL, which is exactly 16 times the T1 bit rate. It is reset to zero when the maximum count occurs, and simultaneously by the f0 frame rate pulse from the PLL MASTER CLOCK in the T1 MODULE, described below. The HEADU FRAME TIME COUNTER therefore outputs a T1 format frame time count with resolution down to 1/16th of a bit (40 nanoseconds). The 12 bit count output, plus an additional 13th bit, which identifies the framing bit in the T1 format, is routed in parallel to the HFT LATCH.

The HFT LATCH 24 is a 13-bit parallel-in, parallel-out latch. When the rising edge of the RBURST signal occurs, the HFT at this instant is latched and held for access by the processor for use in calculations in the synchronization algorithm.

The PATH DELAY COUNTER 25 is a 13-bit counter. The lower 12 bits are identical to the HEADU FRAME TIME COUNTER, but one additional bit is added to provide a total count length of 2 frames. This is necessary to provide a maximum count time of up to 250 microseconds. The PATH DELAY COUNTER counts the total number of frames, words, bits, and bit fractions that occur from the time the S&S burst is sent to the SUBU to the time a response is received. The maximum count is sufficient to handle the two-way delay over a 20-mile cable length. Since cable delay is approximately 1 nanosecond/ft, a maximum allowance of 250,000 nanoseconds (250 microseconds) or 2 T1 frames, is sufficient. The PATH DELAY COUNTER is incremented by the FTCL signal, and reset to zero by the t0 signal from the PLL MASTER CLOCK. it begins counting at t0, Precisely as the one-to-zero transition of the start bit in the outgoing S&S data burst occurs. t stops counting, and holds its count until the next t0, precisely as the one-to-zero transition of the start bit of the return response from the SUBU is detected. This path delay count (PDC) is accessed by the HEADU processor for use in calculations in the synchronization algorithm described previously.

The HEADU PROCESSOR 21 is a general purpose microcomputer consisting of a microprocessor (uP) chip, Random Access Memory (RAM), Read Only Memory (ROM), some random logic, input/output circuitry, and software. A DATA BUS and address-/control bus (ADDR/CONTROL BUS) connect to other circuits in the HEADU as required. A FACILITY CONTROL port 15 is provided to allow controlling the HEADU PROCESSOR operations from a facility host computer.

To implement the features of the SMDCN, the HEADU PROCESSOR software program enables the HEADU to:

achieve initial synchronization of the system via the synchronization algorithm described above, maintain synchronization of the system by communication with each SUBU via the FDL as previously described. The HEADU PROCESSOR accomplishes this by generating in software a complete synchronous data link bit stream and outputting this on the TXFDL line, generate and output signaling data to external switching equipment, accept and respond to signaling inputs from external switching equipment, generate signaling outputs for and read signaling inputs from the SUBUs, and respond accordingly, and set up and clear down calls, actively assigning the data words of the T1 format as required to meet the signaling requirements.

HEADU T1 Module

Figure 8:
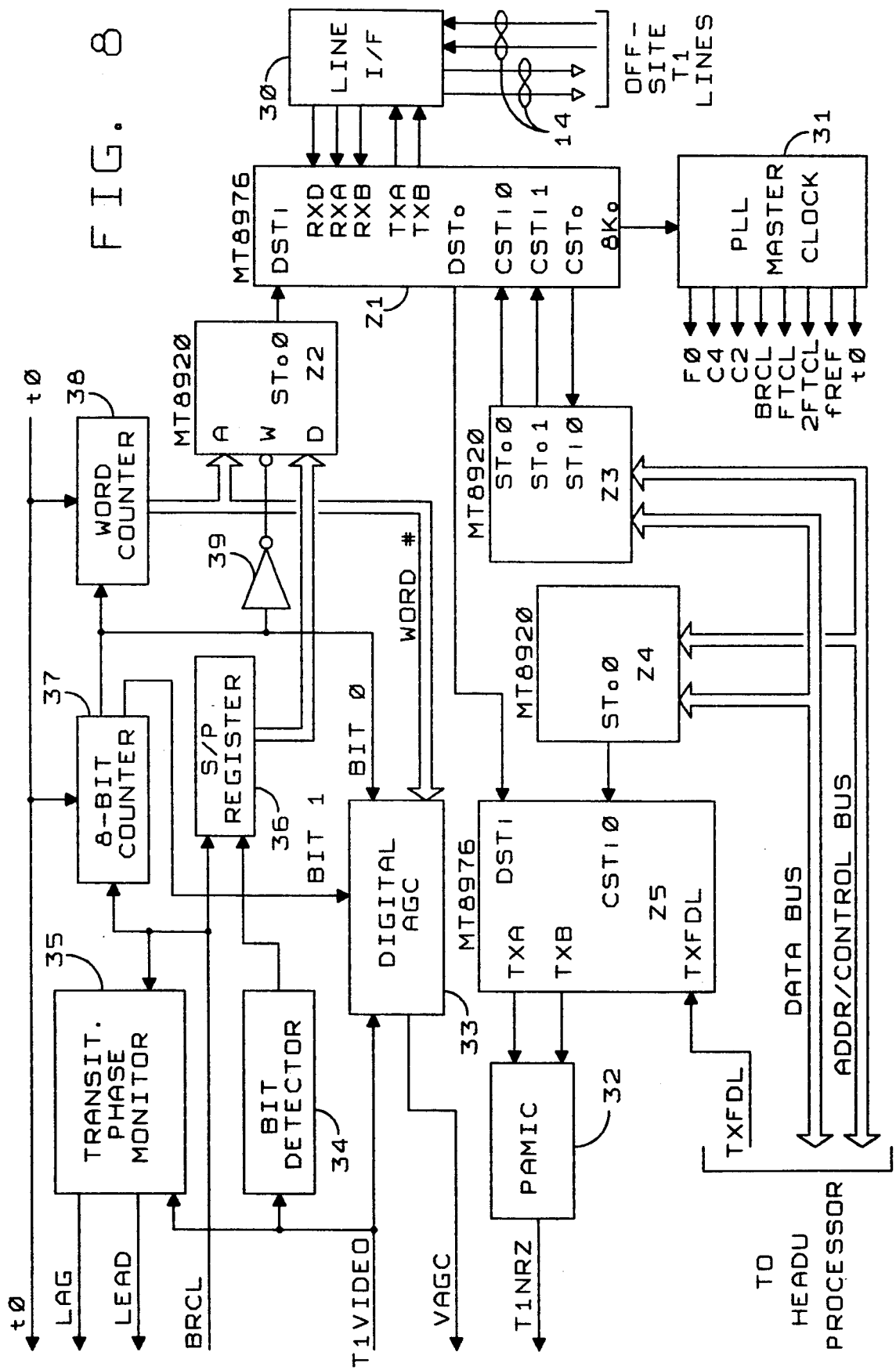
FIG. 8 is a detailed block diagram of the HEADU T1 MODULE.

Referring to FIG. 8, a simplified schematic of the HEADU T1 MODULE 12, which interfaces the SMDCN T1 baseband data streams—T1NRZ and T1VIDEO—to a standard two-way pair of T1 digital transmission lines originating "off-site", as also shown in FIG. 1 and FIG. 5. Typically, the off-site end of these would connect to a Digital Access Crosspoint Switch (DACS), in a telephone carrier trunk office providing access to the public switched network, or in a private switched network service facility.

These off-site T1 lines connect to a conventional LINE INTERFACE circuit 30. The LINE INTERFACE circuit converts the Alternate Mark Inversion (AMI) code used on standard T1 lines to a 2-wire RZ code representation, hereafter to be referred to as "pseudo-AMI" (PAMI) code in this document. AMI code is a bipolar code which represents each successive logic ONE with a pulse of the opposite polarity from the last one, while a logic ZERO has no pulse at all. PAMI code as herein defined, splits the AMI code into 2 signals, RXA and RXB, one of which contains all the positive-polarity pulses and the other of which contains all the negative-polarity pulses from the AMI signal. These PAMI code signals RXA and RXB are inputs to Z1, a Mitel MT8976 integrated circuit, which is specifically designed to synchronize to T1 digital trunk signals and convert them to Mitel ST-Bus signals. The Mitel ST-Bus is a serial telecom bus specifically designed to expedite the routing and processing of digital signals within telecom equipment. Specifications for the Mitel ST-Bus and the Mitel integrated circuits called out herein are documented in specification sheets and application notes published separately and in the "MICROELECTRONICS DATA BOOK, ISSUE 5, COPYRIGHT 1988", published by Mitel Corporation as previously stated. The MT8976 chip requires the PAMI code on its T1 inputs RXA and RXB and generates the PAMI code at its T1 outputs TXA and TXB.

Z1 synchronizes to the incoming T1 data stream, and generates an 8 KHz frame rate output signal 8Ko, synchronized to the incoming data frame rate. This is routed to the PLL MASTER CLOCK 31 which contains a phase lock loop and a number of counter/divider circuits which therefrom generate in conventional manner all the timing and clock signals used in the HEADU circuitry, phase locked to 8Ko, and therefore also to the incoming T1 data frame, as required by the Mitel ST-Bus specification. The ST-Bus clocks include f0, C4, and C2, which are routed to the remaining chips as specified in the Mitel documentation, and these connections are not shown on the diagram. The remaining SMDCN clocks include BRCL, 2FTCL, fREF, and t0, which are so labelled where used throughout the figures.

The incoming data from the off-site T1 line is output by Z1 in ST-Bus format on the DSTo line. This is routed to Z5, an identical integrated circuit (IC), where the data is re-generated in T1 format, and output on the TxA and TxB lines in the PAMI code. The two-wires of the PAMI-code T1 stream are combined in the PAMI Converter circuit PAMIC 32 to produce an NRZ code output. This signal, T1NRZ, is routed to the HEADU RECEIVER/TRANSMITTER 10, where it modulates the downstream T1 carrier.

The off-site incoming T1 data stream is converted to ST-Bus and then back to T1 again in the manner described above to allow the control words and FDL data stream to be added by the HEADU PROCESSOR. This is accomplished at the CSTi0 and TXFDL inputs, respectively, of Z5. TXFDL is a 4 KB/s data stream output directly by the processor, while CSTiO is generated in ST-Bus format by a Mitel MT8920 Parallel Access Circuit, under direct control of the processor.

Control words and signaling information embedded in the off-site incoming T1 data stream are made available to the HEADU PROCESSOR via the CSTo output of Z1 and the STi0 input of circuit Z3, another MT8920. In addition, Z3 allows the HEADU processor to insert control words and signaling into the outgoing off-site T1 stream via its STo0 and STo1 outputs, which are routed to the CSTi0 and CSTi1 inputs of Z1 respectively.

The T1VIDEO data stream is routed to the BIT DETECTOR circuit 34. This circuit makes a one/zero decision on each bit at the transition time of the BRCL signal. The output serial bit stream is clocked into an 8-bit serial-to-parallel conversion register S/P REGISTER 36. Simultaneously, BRCL clocks an 8-BIT COUNTER 37 which generates a half-bit-wide word rate signal BIT 0 during the last bit of every word. The BIT 0 signal increments WORD COUNTER circuit 38 which counts and thereby identifies each incoming word of the T1 format. Both the 8-BIT COUNTER and the WORD COUNTER are synchronized to the T1 frame by t0. The word count output (WORD #) is routed to the DIGITAL AGC circuit 33 described below, and also drives the address inputs A of Z2, while the S/P REGISTER 36 parallel data outputs drive the data inputs D of Mitel MT8920 IC Z2. The BIT 0 pulse is inverted by inverter circuit 39 and routed to the write control pin W of Z2 where it writes each 8-bit word into Z2, which then creates an ST-Bus version of the received T1VIDEO data stream and outputs this on its STo0 pin. This is routed to the DSTi input of Z1, which merges the data with control words and signaling information from its CSTi1 and CSTi0 inputs and adds frame synchronization bits per T1 specification, thereby creating a new T1 data stream. This T1 bit stream emerges from Z1 in PAMI code via paired signals TXA and TXB, and are converted by LINE INTERFACE circuit 30 into a conventional telephone T1 signal, which is routed off-site as required.

Referring still to FIG. 8 and also FIG. 7, a sample clock phase correction loop is implemented in the HEADU. The T1VIDEO is initially set in correct phase with the BRCL by the synchronization algorithm in the S&S mode as previously described. It is maintained in correct phase during T1 mode operation by closing a phase correction loop around the system, using the FDL channel as follows: The TRANSITION PHASE MONITOR circuit 35 compares the transitions of the T1VIDEO signal with that of the BRCL. Normally, the transitions in T1VIDEO should occur midway between two BRCL transitions. Excessive drift in either direction between the two signals causes a LAG or LEAD output to be sent to the HEADU PROCESSOR 21, which then outputs a command on the FDL channel causing the errant SUBU to increment or decrement its frame time, thereby correcting the phase error.

Referring still to FIG. 8 and also FIG. 6, a digital automatic gain control loop is implemented. Optimum operation of the BIT DETECTOR circuit 34 require that the T1VIDEO signal amplitude be maintained within limits. However, the signal strength received at the HEADU from different SUBUs at different distances down the cable can vary up to 30 dB. Consequently, if optimum bit detection performance is to be achieved, a means of adjusting the gain in the receiver on a word-to-word basis of the T1 frame is required.

Figure 9:
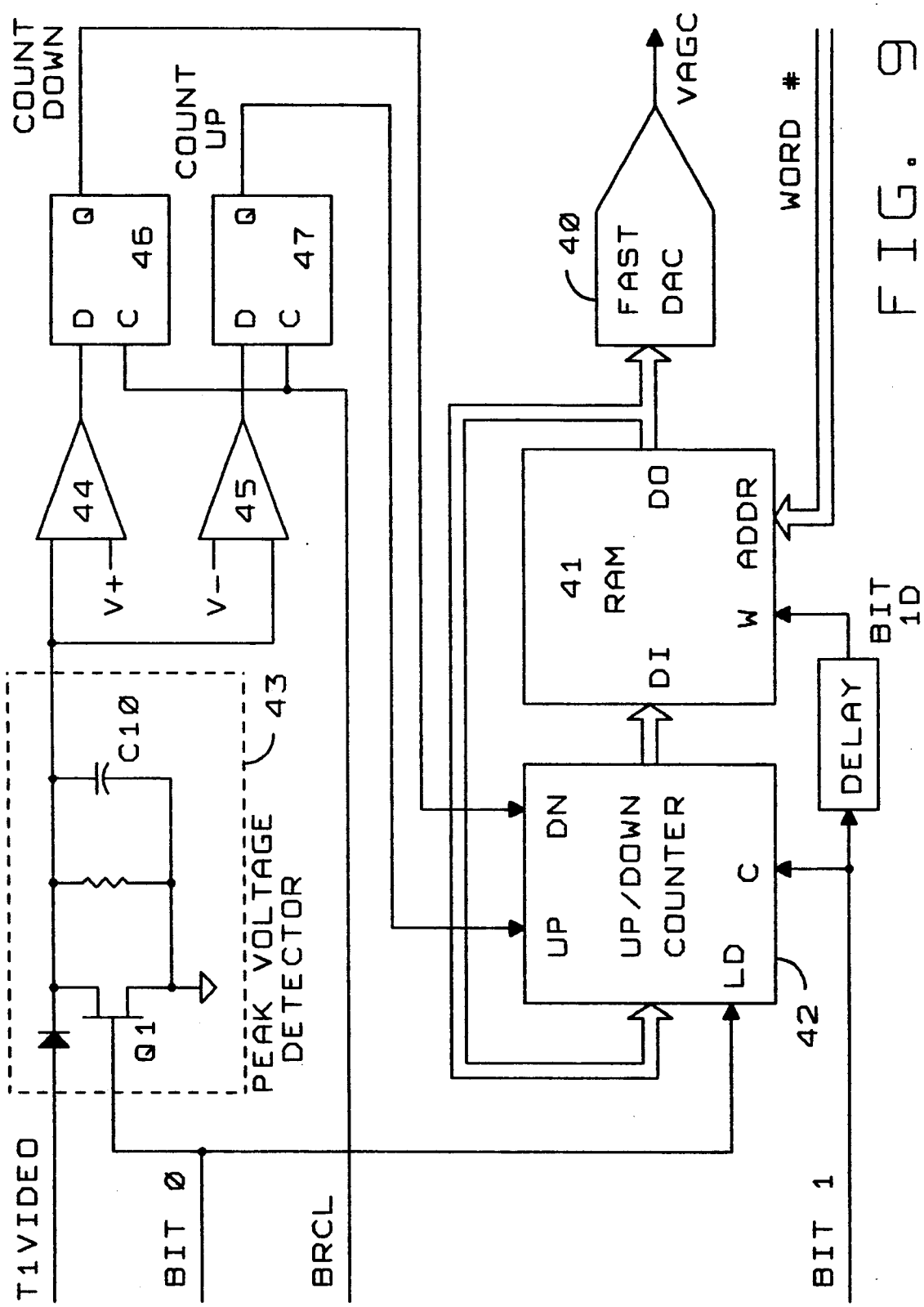
FIG. 9 is a simplified schematic of the HEADU automatic gain control circuit

Referring to FIG. 9, a simplified schematic of the DIGITAL AGC circuit 33 of FIG. 8, and also to FIG. 6, the gain of the IF amplifier in the T1 VIDEO DETECTOR IC VD-1 of FIG. 6 is controlled by voltage VAGC. This voltage is generated by high speed digital-to-analog converter FAST DAC 40. The digital input to the DAC is a 6-bit AGC control word stored in 24-word RAM 41. Each of the 24 words is a digital representation of the value of VAGC for each of the 24 words in the T1 data stream, one from each of 24 transmitting SUBUs. As the first bit of each new word is received on T1VIDEO, the RAM outputs the new stored word, and the FAST DAC slews to the corresponding AGC voltage. Simultaneously, the word from the RAM is loaded into 6-bit up/down counter UP/DN COUNTER 42.

A peak voltage detector circuit 43 tracks the voltage of a logic ONE level of T1VIDEO, which represents 100% carrier. The circuit contains a FET switch Q1 which is driven by the BIT 0 signal from the 8-BIT CTR 37, and resets the voltage to zero at the beginning of each word. Simultaneously, BIT 0 loads the 6-bit gain-value for this word from the RAM into the counter. As logic-1 level bits come in, capacitor C10 charges up to the peak voltage. At the end of each word time, this level is compared with a high and low limit (V+ and V−) at voltage comparators 44 and 45 and the result is stored in latches 46 and 47. If it exceeds either limit, a COUNT DOWN or COUNT UP enable signal is generated. These two signals steer the direction of counting of UP/DOWN COUNTER 42, which is then either incremented or decremented one count by clock signal BIT 1 toward reducing the gain error. The output of the counter is stored in the RAM 41 by the slightly delayed BIT 1D signal and becomes the AGC control word for the same T1 word the next frame. In this manner, the AGC control word for each T1 word tracks the RF signal level received from the corresponding SUBU and maintains the T1VIDEO signal at the correct level.

When initially going into the T1 mode on a given channel, the AGC control word may be a maximum of 32 counts in error. In order to expedite initialization of the AGC to the correct value, the SUBU transmits a preamble of words containing alternate ONES and ZEROS for 32 frames, before transmitting real voice or data information.

SUBU CIRCUIT DESCRIPTION

Figure 10:
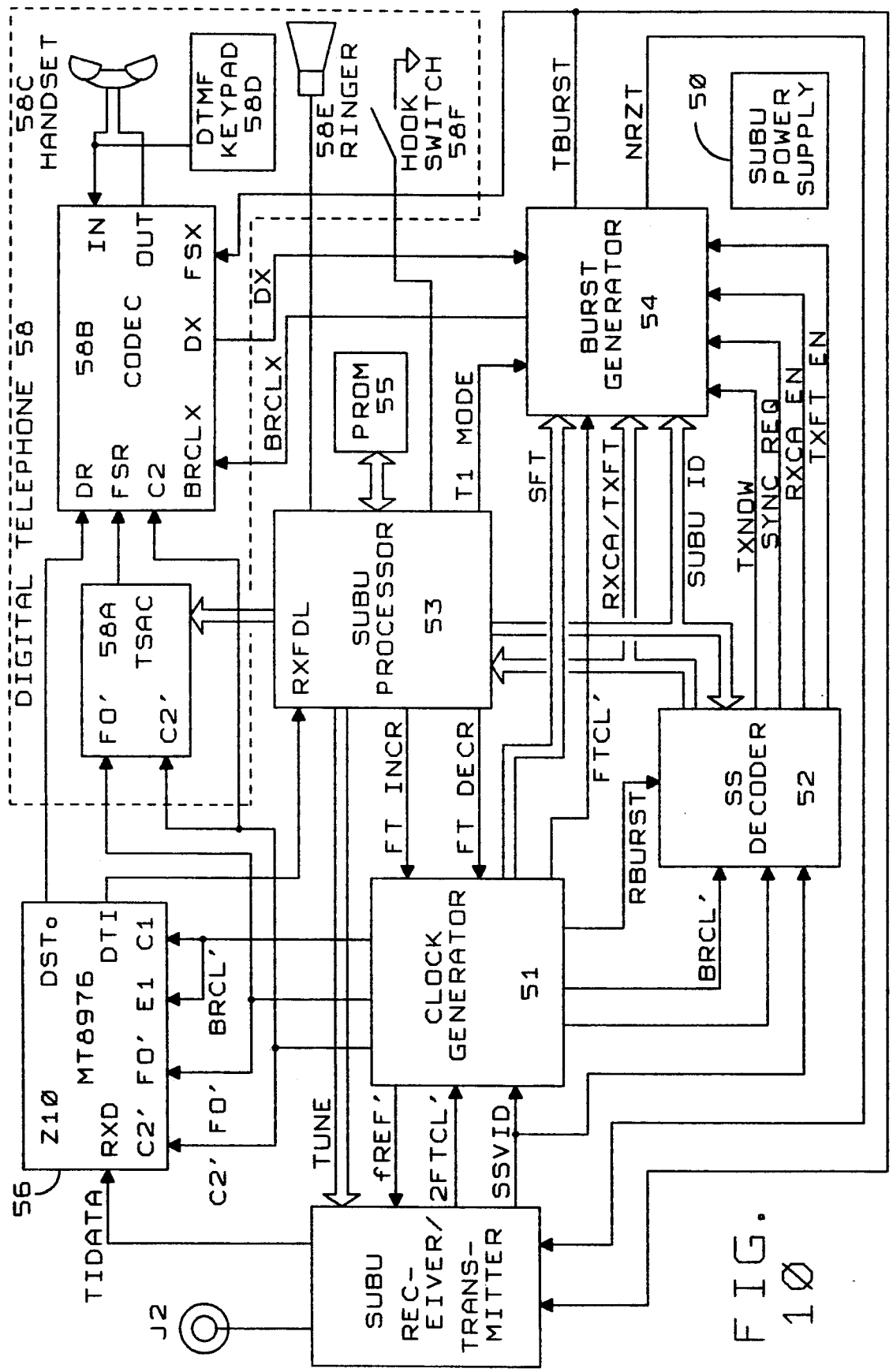
FIG. 10 is a block diagram of the entire SUBU.
Figure 11:
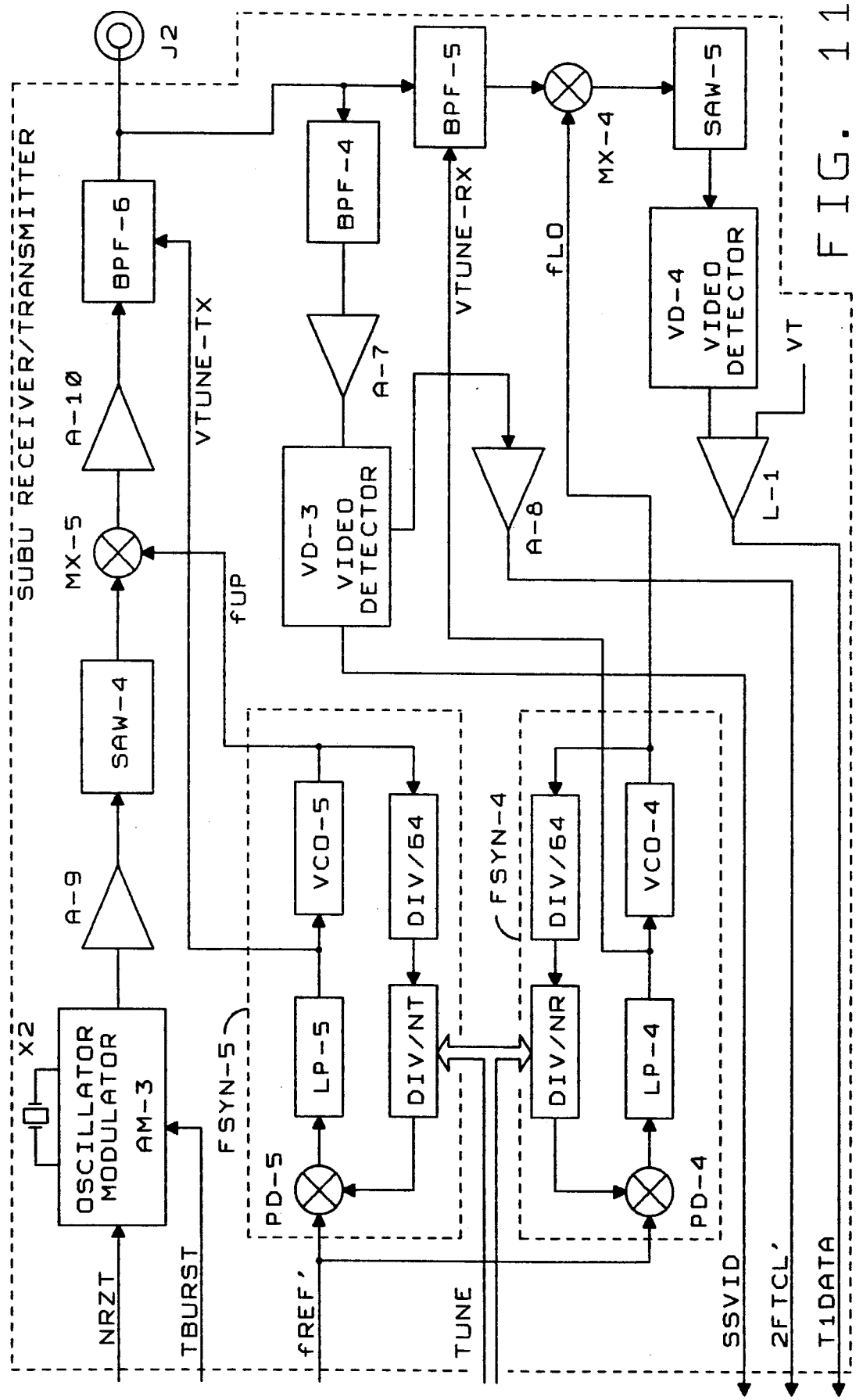
FIG. 11 is a detailed block diagram of the SUBU RECEIVER/TRANSMITTER module.

Referring to FIG. 10, a detailed block diagram of the entire SUBU, the subscriber unit, and also to FIG. 11, a simplified schematic of the SUBU RECEIVER/TRANSMITTER, the SUBU connects to the transmission medium cable via connector J2, and communicates with the HEADU as described previously in "RF COMMUNICATIONS". Each circuit block of the

SUBU is described below. In the description following and the referenced figures, several of the signals in the SUBU circuitry serve the identical function as signals in the HEADU circutry, and to simplify the understanding of the circuit operation it is convenient to give them the same names. To avoid confusion, these signals in the SUBU are distinguish by attatching an (') to the end of the signal name.

SUBU RECEIVER/TRANSMITTER

The 49.408 MHz S&S carrier from the cable is routed through filter BPF-4, which has a lower-vestigial-sideband filter passband characteristic. The signal is amplified in amplifier A-7, and routed to video detector chip VD-3. VD-3 contains a phase-lock-loop oscillator which locks on to the 49.408 MHz carrier and demodulates it, outputting the baseband data burst as SSVID and routing it to the CLOCK GENERATOR and SS DECODER circuits.

The oscillator signal from VD-3 is also output, buffered and converted to logic level by amplifier A-8, and routed to the SUBU circuitry as 49.408 MHz clock signal 2FTCL'.

The incoming RF signal is also routed to BPF-5, a bandpass filter with center frequency tuned to the center frequency of the incoming downstream T1-modulated carrier signal. BPF-5 rejects any out-of-band signals or noise that may be on the cable, and passes this desired downstream RF signal to MX-4, where it is downconverted by mixing with the 259.392 MHz local oscillator signal fLO generated in frequency synthesizer FSYN-4, described below. The mixer output contains the desired lower-vestigial-sideband received signal translated to the 45.75 MHz IF frequency, plus a number of undesired harmonics. This is filtered by SAW-5, a standard 45.75 MHz television video IF Surface Acoustic Wave (SAW) filter, which passes only the selected IF signal. The filter output is routed to VD-4, a phase-lock-loop video detector circuit such as a National Semiconductor LM1823 integrated circuit, which recovers the baseband data stream in NRZ code. This video NRZ signal is routed through limiter circuit L-1, which compares it to a DC threshold voltage VT midway between the peaks, and converts the signal to a logic-level NRZ form, output as T1DATA.

The baseband data stream to be transmitted upstream, NRZT, is generated in the BURST GENERATOR as described below and routed to a gated crystal oscillator/modulator circuit AM-3 where it amplitude modulates a 70.454 MHz carrier. Crystal X2 stabilizes the carrier frequency. The modulator is gated with the TBURST signal, which allows it to output carrier only for the 8-bit duration of the data burst. The double-sideband output of the modulator is amplified by A-9, then filtered by SAW-4, which is a standard channel-4 television transmitter vestigial-sideband filter. In this application, it passes the lower sideband of the signal, the carrier, and a small portion of the upper sideband, attenuating most of the upper sideband and all other harmonics. The filter output is upconverted to the upstream transmission frequency by mixing in mixer MX-5 with the upconversion signal fUP from FSYN-5, described below. The output of MX-5 is amplified by A-10, then bandpass filtered by voltage-tuneable filter BPF-6, which removes all the unwanted harmonics produced by the mixer. The resulting signal is routed to connector J2 for transmission on the cable.

The NRZT and TBURST signals control the transmitter modulator in both S&S and T1 modes, and the data content and burst length is different in each as described below. The transmitter output frequency also is different in each mode, and this is accomplished by changing the upconversion signal frequency fUP. This signal is generated in frequency synthesizer circuit FSYN-5, also described below.

SUBU FREQUENCY SYNTHESIZERS

The output of FSYN-5 upconverts the 70.454 MHz modulator output to the upstream channel transmission frequency. In the S&S mode, this upstream carrrier frequency is 411.678 MHz, and in the T1 mode it is 417.854 MHz. The FSYN-5 output, fUP, is 341.224 MHz and 347.400 MHz for each case, respectively, exactly 70.454 MHz below the transmission frequency.

The frequency synthesizer, FSYN-5, shown in FIG. 11, uses a standard phase-lock-loop configuration. A voltage controlled oscillator, VCO-5, generates the upconversion signal, fUP. This signal frequency is divided by 64 and again by $N_T$ in the two frequency dividers DIV/64 and DIV/$N_T$, respectively. The output of DIV/$N_T$ is exactly 24.125 KHz when the VCO frequency is correct. This output is compared in phase detector PD-5 with the 24.125 KHz reference frequency fREF' generated in and output by the SUBU CLOCK GENERATOR circuit 51, described below. Any phase error between the two signals results in an error voltage at the phase detector output. This voltage is routed through low-pass filter LP-5 to the VCO input, where it drives the VCO frequency in the correct direction to null out the error voltage, and simultaneously, any frequency or phase error. This voltage, VTUNE-TX, is also routed to BPF-6 where it tunes the center frequency of this filter to the correct output upstream transmission frequency.

The output frequency fUP is always maintained at exactly:

$$fUP = 24.125\ KHz \times 64 \times N_T$$

In order to generate the two frequencies required for the two transmission modes S&S and T1, $N_T$ must switch between 221 and 225. This is accomplished by the TUNE control lines from the SUBU PROCESSOR 53. To enhance the SUBU design to accommodate tuning a number of upstream frequencies to handle more T1 data channels on the cable, it is necessary to program NT over a larger range via the processor software.

FSYN-4 operates identical to FSYN-5, except in the described implementation it always operates at the fixed frequency of 259.392 MHz, for which $N_R = 168$. The output of FSYN-4 is local oscillator signal fLO which downconverts the received downstream carrier to the 45.75 MHz receiver IF frequency.

To enhance the SUBU design to accommodate tuning a number of downstream frequencies to handle more T1 data channels on the cable, it is necessary to program NR over a larger range via the processor software. The VCO control voltage VTUNE-RX from FSYN-4 is then routed to BPF-5 which becomes a voltage-tuneable bandpass filter which tunes the center frequency of the incoming downstream carrier. In a multi-channel design where a number of T1 data channels are accommodated, FSYN-4 and FSYN-5 would both be tuned by the TUNE lines from the SUBU processor, under control of the S&S mode commands, to select one of a number of upstream and downstream channel-pairs. BPF-5 and BPF-6 are then voltage-tuned by VTUNE-RX and VTUNE-TX, respectively, to the appropriate center frequency to accommodate the resulting RF carriers.

SUBU CLOCK GENERATOR

The CLOCK GENERATOR 51 generates all the following clock signals used in the SUBU circuits by dividing down 2FTCL', the recovered 49.408 MHz carrier transmitted by the HEADU, in divider chains that are phase-synchronized with the first bit of the SSVID data burst received from the HEADU every 250 microseconds:

- FTCL': The master Frame Time CLock, a 24.704 MHz clock, generated by dividing the 2FTCL' clock by 2.
- C2': A 2.048 MHz clock, used by the Mitel Digital Trunk Interface IC 56 and the digital telephone circuit 58.
- BRCL': The 1.544 MHz Bit Rate CLock, used to sample the received data in both T1 and S&S modes, and to provide the E1 and C1 clock inputs of Z10, the DTI circuit. BRCL' is generated by dividing the 24.704 MHz clock by 16, and phase-synchronizing it to the received SSVID data bursts as described above.
- FO': An 8 KHz frame rate clock. This is the frame synchronization signal for the T1 format and the Mitel ST-Bus.

In addition to the above, the CLOCK GENERATOR contains the SUBU Frame Time Counter, which generates the SUBU Frame Time, SFT. The SFT is a frame time count which defines the T1 frame in the SUBU exactly as the HFT does in the HEADU. The two counters are frequency synchronized as a result of being incremented in step by the FTCL' and FTCL respectively, which are phase locked together. However, they are not phase synchronized, as defined by the beginning of the T1 frame, and a Frame Time Offset FTO normally exists between them. The SFT is output by the CLOCK GENERATOR and routed to the BURST GENERATOR for use in determining the correct instant for generation of the output data burst.

T1/ESF DIGITAL TRUNK INTERFACE CIRCUIT

Synchronization to the T1 data frame and recovery of single DSO channel T1 data is accomplished by the Mitel MT8976 T1/ESF DIGITAL TRUNK INTERFACE CIRCUIT (DTI) Z10. This is a standard integrated circuit product of Mitel Corporation, designed for use in T1 digital trunk interfaces between telephone central offices.

The T1DATA signal from the receiver is a T1/ESF serial data stream in NRZ code, and is routed to the RXD input of Digital Trunk Interface IC Z10. The MT8976 performs word and frame synchronization and outputs all 24 channels of the T1 data on a single wire output DSTo in the Mitel ST-Bus format. In addition, the MT8976 provides a Facility Data Link (FDL) output RXFDL, which is a 4 KB/s data stream. The FDL contains control data from the HEADU to each SUBU. RXFDL is routed directly to the the SUBU PROCESSOR 53, where word and frame synchronization is performed in software, and any data directed at the subject SUBU is extracted. C2', F0', E1 and C1 timing signals are provided for Z10 by the CLOCK GENERATOR 51.

SUBU DIGITAL TELEPHONE

A digital telephone circuit is used in the described embodiment of the invention to demonstrate the utility of the subscriber end of the SMDCN communications link because this is the most difficult application to accommodate in a digital multi-user network. Any number of alternate applications, including computer networking, can be accommodated by replacing the digital telephone with other conventional designs which interface with the Mitel ST-bus and the BURST GENERATOR circuit in the same manner as the digital telephone circuit described below.

The DIGITAL TELEPHONE circuit 58 consists of two integrated circuits 58A and 58B, a telephone HANDSET 58C, a tone-dialing DTMF KEYPAD 58D, a RINGER device 58E, a HOOKSWITCH 58F, and a software routine in the SUBU PROCESSOR 53. The ST-BUS data output DSTo of DTI circuit Z10 is routed to a standard telephone PCM coder/decoder (CODEC) integrated circuit 58B such as a National Semiconductor TP3053. This circuit reconstructs the analog voice signal from the data on one of the 24 T1 channels. The channel is selected by a Time Slot Assignment Circuit (TSAC) 58A such as a National Semiconductor TP3155. This circuit accepts the C2' clock input and the F0' frame rate input from the CLOCK GENERATOR 51, and is programmed by the SUBU PROCESSOR 53 to generate a synchronization pulse FSR during the time the 8 bits of the selected channel data word are clocked out of Z10 on the DSTo line. The CODEC 58B accepts this 8-bit word, performs a digital-to-analog conversion, and drives the earphone in the handset 58C with the reconstructed analog voice signal. Specifications for the TP3053 CODEC and TP3155 TSAC ICs are documented in specification sheets and in the "1984 Telecommunications Handbook" published by National Semiconductor Corporation. Software in the SUBU PROCESSOR reads the HOOKSWITCH 58F for on-hook or off-hook status, and switches the RINGER device on and off as commanded by the HEADU in the S&S mode. The DTMF KEYPAD 58D is a conventional tone-dialing device which outputs the standard telephone industry Dual-Tone Multi-Frequency (DTMF) dialing tones on to the CODEC analog input whenever the keys are depressed.

The analog voice signal from the microphone of the telephone HANDSET 58C is also routed to analog input of the CODEC 58B. This analog signal, either the DTMF tones or voice or a mixture of the two (as they are simply summed together at the CODEC input), are encoded into 8-bit digital data words. Each of these 8-bit words is serially output on the DX pin of the CODEC chip when a frame sync input pulse is applied to the FSX input. The TBURST signal provides this sync pulse to the CODEC, serially gates the DX data to the NRZT line within the BURST GENERATOR, and simultaneously gates the carrier to the modulator AM-3 in the SUBU transmitter of FIG. 11.

SS DECODER

Every 250 microseconds, the SS DECODER 52 receives and detects the 30-bit SSVID data burst, which is clocked into a serial-to-parallel conversion register by BRCL', gated by the RBURST signal. The parallel data is held there until the receipt of the next burst 250 microseconds later. During this time, the SS DECODER decodes selected bits of the stored data to identify the command, and generates one of the following command control outputs: SYNC REQ (Sync Request), RXCA EN (Ring/Receive Channel Assign ENable), or TXFT EN (Transmit Frame Time Assign ENable). The command, along with the remaining data upon which the command must operate, if applicable, are routed to the BURST GENERATOR and the SUBU PROCESSOR, as required.

The SS DECODER circuit also compares the 15 bits of received SUBU ID in the SSVID burst with the stored SUBU ID from the processor. If these compare, a TXNOW signal is generated, which causes the TX BURST GENERATOR to begin transmitting the appropriate S&S response burst to the HEADU.

BURST GENERATOR

The BURST GENERATOR 54 generates the baseband data burst NRZT which modulates the transmitter carrier for transmission over the cable to the HEADU, and also an enabling signal TBURST, which gates the carrier to the modulator only during the allowed transmission time slot. The length of the data burst, and the operation of the circuit, depends on the operating mode of the SUBU, as follows:

T1 Mode: In the T1 mode, the burst is an 8-bit data word representing a sample of the voice data from the CODEC 58B. This word is serially clocked out of the DX pin of the CODEC by the BRCLX clock during the time the FSX pin is driven high by the TBURST signal. The BURST GENERATOR serially gates the data word on to the NRZT output pin in this mode.

In the BURST GENERATOR 54, a digital comparator circuit continuously compares the 12 bits of Subu Frame Time SFT routed from the CLOCK GENERATOR 51 with the stored 12 bits of Transmit Frame Time (TXFT) assigned by the HEADU and stored in the SS DECODER 52 as a result of previous successfull completion of synchronization and signaling activity. When these match, the TBURST signal is raised to a ONE level. This is the precise instant (within the 40 ns resolution of the FTCL clock) that the SUBU is allowed to transmit. The BRCLX clock is 1.544 MHz, generated by dividing the 24.704 MHz FICL' clock by 16. At the same time TBURST is generated, the frequency divider is reset, thereby synchronizing BRCLX with TBURST. These two signals, applied to the CODEC, cause the output of the data burst to occur precisely at the SUBU Frame Time specified by the TXFT assignment from the HEADU.

S&S Mode: In the S&S mode, the NRZT pin outputs a burst of 40 bits. The first 10 bits are all ONES, which represent a 100% carrier level out of the modulator. This provides a 6.5 microsecond burst of 100% carrier at the beginning of each data burst which is used by the HEADU receiver to set the threshold level in its bit detection circuit. Following the 10 ONES is a ZERO "start bit", followed by 28 data bits, followed by another ZERO "stop bit", as shown in FIG. 4.

The BURST GENERATOR accepts the SUBU ID (15 bits) from the SUBU PROCESSOR, the SUBU Frame Time SFT from the SFT COUNTER in the CLOCK GENERATOR, the assigned Transmit Frame Time TXFT, or the Receive Channel Assignment RXCA from the SS DECODER, depending on the command received from the HEADU. Depending on the command, the correct combination of this data is loaded into a parallel/serial register and clocked out serially on NRZT.

The transmission of the burst is initiated by the TXNOW signal from the SS DECODER. TXNOW occurs precisely TX seconds after the first bit of the S&S interrogation burst was received from the HEADU. The time delay TX is a system constant known to the HEADU and utilized in the HEADU software algorithm for the synchronization of all SUBUs to the HEADU, as described previously.

SUBU PROCESSOR

The SUBU PROCESSOR 53 consists of a general purpose microprocessor integrated circuit, RAM (random access memory), ROM (read only memory), some random logic and peripheral interface ICs It provides all the "smart" controller functions required by the SUBU circuitry The SUBU PROCESSOR contains software which:

- reads the SUBU ID from Programmable Read Only Memory (PROM) 55, and provides this to the BURST GENERATOR and the SS DECODER so that these circuits can respond to the HEADU S&S interrogation bursts as described above,
- reads the RECEIVE CHANNEL ASSIGNMENT (RXCA) from the SS DECODER and programs the TSAC 58A so the digital telephone decodes the correct T1 channel,
- tunes the upstream and downstream RF channel-pair in the SUBU RECEIVER/TRANSMITTER via the TUNE control lines to tune the RF channels commanded by the HEADU,
- provides a software word and frame synchronizer for the 4 KB/s Facility Data Link (FDL) through which it receives control and status information from the HEADU while operating in the T1 mode,
- commands the CLOCK GENERATOR to increment or decrement the phase of the SUBU frame time clock in response to commands from the HEADU,
- reads the status of the telephone HOOKSWITCH 58F and responds to the HEADU S&S mode interrogations accordingly,
- determines the operating mode T1 or S&S and sets the mode control line T1 MODE accordingly, and activates the telephone ringer device as required.

Two SUBU functions are controlled via the FDL—channel cleardown and SUBU FRAME TIME clock adjustment. When cleardown of an operating channel is initiated from the HEADU, the cleardown command is routed over the FDL, which is output on the RXFDL pin of Z10, and recognized by the SUBU PROCESSOR, which then causes the SUBU to switch back into the S&S mode. The SUBU FRAME TIME clock adjustment is commanded when the HEADU determines the SUBU transmissions are drifting out of phase with their assigned time slots and/or out of phase with the receiver clock signal BRCL. If this occurs, the HEADU commands an "increment" or "decrement" of the SUBU FRAME TIME clock. The SUBU PROCESSOR receives this command over the FDL on RXFDL, and outputs a FTINCR (frame time increment) or FTDECR (frame time decrement) signal to the Frame Time Counter in the CLOCK GENERATOR. In this manner, a closed loop is created which maintains the SUBU transmissions in precise synchronization with the HEADU bit rate clock.

SUBU POWER SUPPLY

Referring still to FIG. 10, the SUBU contains a power supply module 50 of conventional design which connects to a 60 Hz AC power source and generates all the required DC voltages. These connections are not shown on the diagram.

APPLICATION OF THE INVENTION TO A FIBER OPTIC NETWORK

Figure 12:
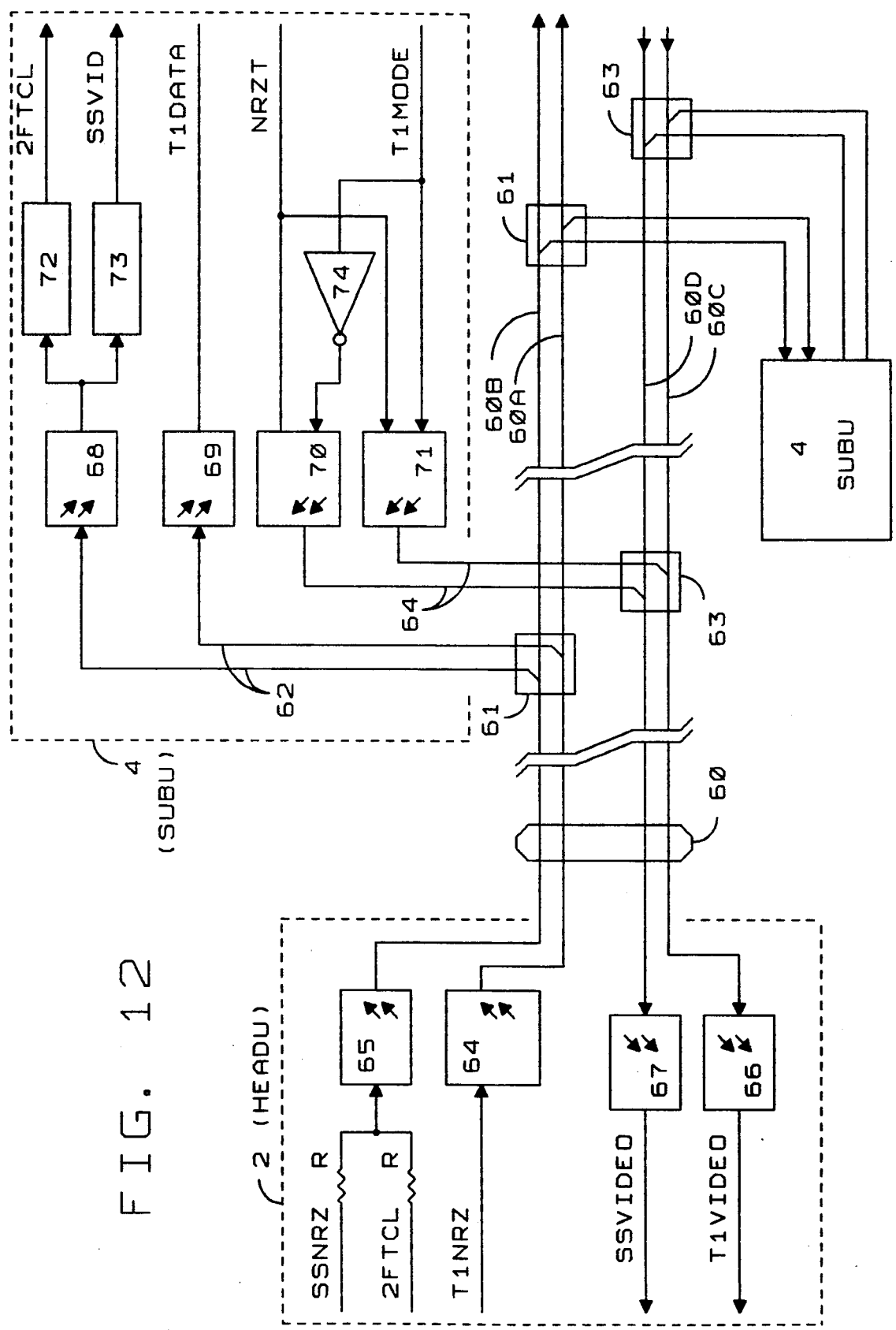
FIG. 12 is a system-level diagram of the SMDCN implemented in optical fiber, also showing in detail the components of the HEADU and SUBU that are different from the coaxial cable implementation described as the primary implementation.

Referring to FIG. 12, a block diagram of an embodiment of the SMDCN invention implemented in a fiber optic network, the network topology takes the form of an optical fiber bus extending out from the HEADU with a branch connecting from the main bus to each SUBU it passes by. The fiber optic bus 60 consists of a bundle of 4 fibers, two carrying the light signals downstream and two carrying them upstream. Fibers 60A and 60B carry the downstream T1 and S&S transmissions, respectively, while 60C and 60D carry the upstream T1 and S&S transmissions, respectively. The connection of the branches to the downstream bus is made in a fractional coupler 61 which tap off a small fraction of the light energy from the main bus fibers and route it down the branches 62. In the upstream direction, a large part of the light energy in fibers 64 is coupled into the main bus fibers at couplers 63.

Operation of the SMDCN is identical in this fiber optic implementation as in the cable implementation previously described, with the exception that the signals are carried by light streams on an optical fiber instead of RF carriers. Consequently, the RECEIVER/TRANSMITTER module in both the HEADU and SUBU are replaced by suitable optical transmitter and detector circuitry, as described below:

At the HEADU 2 the T1NRZ signal directly modulates optical transmitter 64. The SSNRZ and 2FTCL signals are summed together in resistors R and modulate optical transmitter 65. (Alternately, each of these could each be transmitted down their own separate fiber, but then a fifth fiber must be added to the bundle 60.) These transmitter outputs are coupled to optical fibers 60A and 60B, respectively. Optical fibers 60C and 60D are coupled to optical detectors 66 and 67, respectively, which demodulate the incoming light streams from the SUBUs and output logic signals T1VIDEO and SSVIDEO, respectively, which are processed in the HEADU circuitry in the same manner as in the cable system previously described.

In the SUBU, optical detector 68 demodulates the light stream incoming on fiber 60B. The output is filtered by bandpass filter 72 and lowpass filter 73 to separate the two signals, 2FTCL and SSVID, respectively, which are processed in the SUBU in the same manner as in the cable system previously described. Optical detector 69 demodulates the incoming light stream on fiber 60A, and outputs T1DATA which is processed in the SUBU in the same manner as in the cable system previously described. The NRZT signal from the BURST GENERATOR is routed to two gated optical transmitters 70 and 71, one of which is allowed to transmit in the T1 mode and the other in the S&S mode by the gating signal T1MODE and its complement, generated by inverter 74. The output light streams from optical transmitters 70 and 71 are coupled to fibers 60D and 60C, respectively, and are thereby routed to the HEADU.

What is claimed is:

1. A communication system comprising a central head end station connected to a multichannel transmission medium and a plurality of remote stations also connected to said transmission medium at various distances from said head end station, said head end station including receiver means for receiving from said plurality of remote stations a serial synchronous time domain multiplex data stream in baseband or modulated signal form containing a plurality of sequential time slots arranged in a repetitious data frame, each time slot dedicated at any given instant to contain a data word of a predetermined number of bits transmitted by one particular remote station of said plurality of remote stations, and automatic gain control means, hereinafter referred to as AGC means, for setting the gain of said receiver means to an optimum independent value for each of said time slots at or immediately prior to the beginning of each of said time slots, wherein said AGC means includes memory means for storing an independent automatic gain control value, hereinafter referred to as AGC value, associated with each time slot, measurement means for measuring the signal amplitude of said data stream received in each time slot, and correcting means for automatically correcting each of said stored AGC values to compensate for variations in signal level of said data stream.

2. A communication system according to claim 1 wherein said transmission medium consists of one or more broadband cables or one or more optical fibers or a combination of broadband cables and optical fibers.

3. A communications system according to claim 1 wherein said serial synchronous time domain multiplex data stream is of the type known in the telecommunications industry as a T1 multiplex.

4. A communications system according to claim 2 wherein said serial synchronous time domain multiplex data stream is of the type known in the telecommunications industry as a T1 multiplex.

5. In a communication system comprising a central head end station connected to a multichannel transmission medium and a plurality of remote stations also connected to said transmission medium at various distances from said head end station, said head end station including receiver means for receiving from said plurality of remote stations a serial synchronous time domain multiplex data stream in baseband or modulated signal form containing a plurality of sequential time slots arranged in a repetitious data frame, each time slot dedicated at any given instant to contain a data word of a predetermined number of bits transmitted by one of said plurality of remote stations, a method of controlling the gain of said receiver means in a manner to maintain the receiver output at the correct level for optimum detection of every data bit in each of said time slots while receiver input signal level of said data stream varies from one time slot to the next, said method comprising the steps of:

storing in memory means an AGC value for each time slot(, and storing said initial value in memory means);

recalling said AGC value from said memory means at or immediately prior to the beginning of each time slot and applying it to set the gain of said receiver for the duration of said time slot;

measuring the level of said data stream signal occurring within said time slot within said receiver;

comparing said measured data stream signal level with an optimum reference level;

incrementing or decrementing said AGC value by zero, one or more counts each frame in the proper direction to drive said receiver data stream signal level closer to said optimum reference level; and storing the new AGC value back into said memory means for use at the appropriate time slot of a following frame.

6. A method according to claim 5 in a communication system utilizing a serial synchronous time domain multiplex data stream of the type known in the telecommunications industry as a T1 multiplex.

7. In a communication system comprising a central head end station connected to a multichannel transmission medium and a plurality of remote stations also connected to said transmission medium at various distances from said head end station, the central head end station including:

receiver means for receiving a serial synchronous time domain multiplex data stream in baseband or modulated signal form, said data stream containing a plurality of sequential time slots arranged in a repetitious data frame;

AGC means for setting the gain of said receiver means to an optimum value for the duration of each of said time slots at the beginning of each of said time slots, said AGC means including memory means for storing an independent automatic gain control value associated with each time slot, measurement means for measuring the amplitude of said data stream signal received in each time slot, and correcting means for automatically correcting each of said stored AGC values as required to compensate for variations in signal level of said received data stream.

* * * * *